(12) United States Patent
Takagi et al.

(10) Patent No.: US 6,388,955 B1
(45) Date of Patent: May 14, 2002

(54) REPRODUCING METHOD FOR MAGNETO-OPTIC RECORDING MEDIUM, AND MAGNETO-OPTIC DISK DEVICE

(75) Inventors: Naoyuki Takagi; Atsushi Yamaguchi; Kenichiro Mitani, all of Moriguchi (JP)

(73) Assignee: Sanyo Electric Co., Ltd., Osaka (JP)

( * ) Notice: Subject to any disclaimer, the term of this patent is extended or adjusted under 35 U.S.C. 154(b) by 0 days.

(21) Appl. No.: 09/381,498

(22) PCT Filed: Jan. 21, 1999

(86) PCT No.: PCT/JP99/00207

§ 371 Date: Sep. 22, 1999

§ 102(e) Date: Sep. 22, 1999

(87) PCT Pub. No.: WO99/38161

PCT Pub. Date: Jul. 29, 1999

(30) Foreign Application Priority Data

Jan. 23, 1998 (JP) .......................... 10-011341
Nov. 13, 1998 (JP) .......................... 10-323842

(51) Int. Cl.[7] ............................................. G11B 11/00
(52) U.S. Cl. .................................. 369/13.09; 369/13.26
(58) Field of Search ...................... 369/13, 14, 110.1; 360/59, 116

(56) References Cited

U.S. PATENT DOCUMENTS 6,192,008 B1 * 2/2001 Kim ............................ 369/13
6,205,092 B1 * 3/2001 Yamaguchi et al. .......... 369/13
6,226,234 B1 * 5/2001 Ohnuki et al. ............... 369/13

FOREIGN PATENT DOCUMENTS

| EP | 0318925 A2 | 6/1989 |
| EP | 0974960 A1 | 1/2000 |
| JP | 4-258831 | 9/1992 |
| JP | 5-144106 | 6/1993 |
| JP | 8-7350 | 1/1996 |
| JP | WO98/02877 | 1/1998 |
| JP | 10-289487 | 10/1998 |
| JP | 11176036 | 7/1999 |

* cited by examiner

Primary Examiner—Tan Dinh
(74) Attorney, Agent, or Firm—Armstrong, Westerman & Hattori, LLP

(57) ABSTRACT

A reproducing apparatus reproduces a signal recorded in a magneto-optical disk. The magneto-optical disk includes a layered structure having a recording layer, an intermediate layer and a reproducing layer. Laser light is illuminated from an optical head to the magneto-optical disk in such an intensity that no magnetic domain is transferred from the recording layer to the reproducing layer only by the laser light. In this state, alternating magnetic field is applied through a magnetic head to the magneto-optical disk, thereby concurrently causing transfer and expansion of a magnetic domain to the reproducing layer. As a result, transfer of the magnetic domain is effected with expansion.

10 Claims, 24 Drawing Sheets

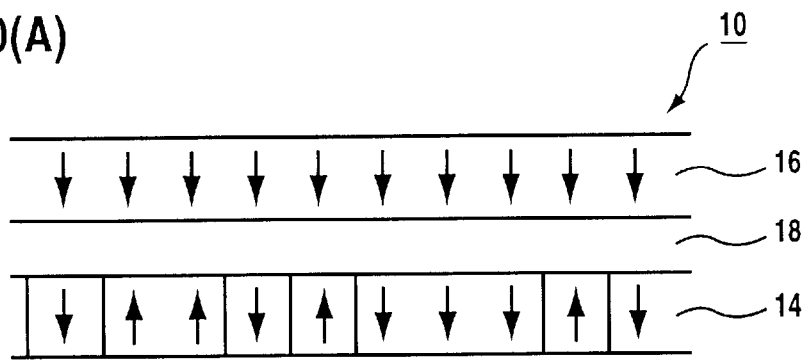
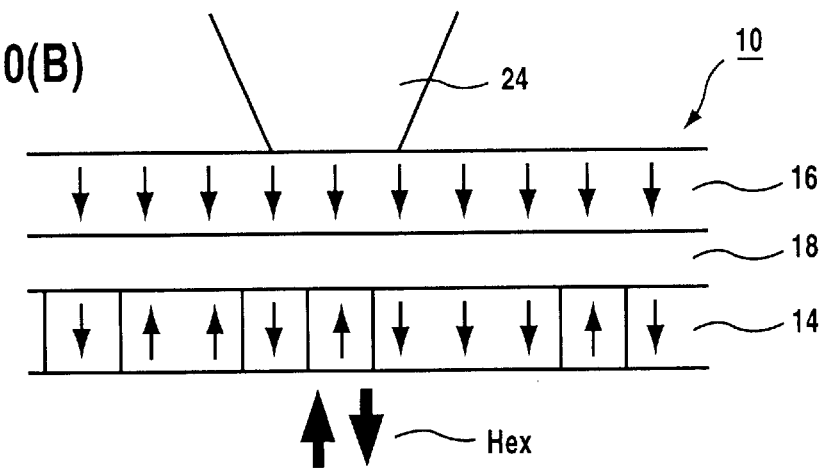
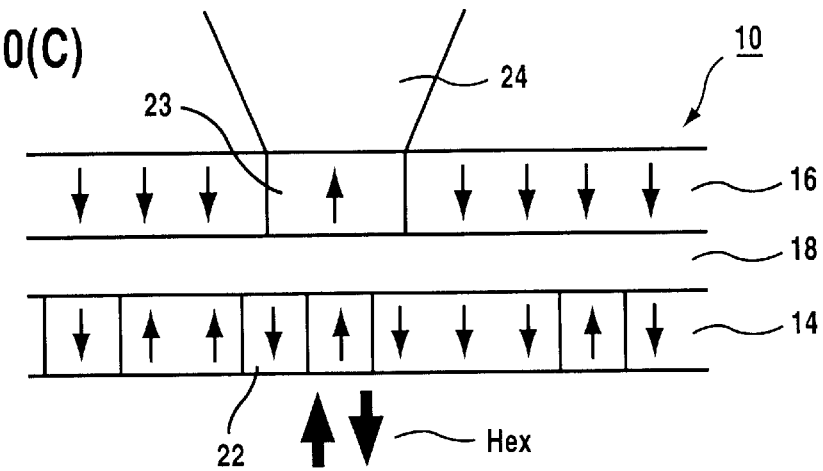

REPRODUCING METHOD FOR MAGNETO-OPTIC RECORDING MEDIUM, AND MAGNETO-OPTIC DISK DEVICE

TECHNICAL FIELD

This invention relates to a reproducing method with a magneto-optical recording medium and, more particularly to a reproducing method with a magneto-optical recording medium including, for example, recording and reproducing layers so that the microscopic domain can be recorded into the recording layer during recording and the recorded magnetic domain of the recording layer be expanded and transferred into the reproducing layer during reproduction.

Furthermore, the invention is concerned with a reproducing method and magneto-optical disk apparatus which reproduces a signal by optimally setting a laser light power level during expanding and reproducing the magnetic domain, wherein the magneto-optical disk apparatus performs signal recording and/or reproducing by using laser light and magnetic field applied to the magneto-optical recording medium.

Prior Art

Attentions have being drawn to magneto-optical recording mediums as rewritable recording mediums that are high in memory capacity and reliability. They have being put into practical use as computer memories, etc. Meanwhile, standardization has being put forward for magneto-optical recording mediums having a recording capacity of 6.0 G bytes toward a standard of AS-MO (Advanced Storage Magneto-Optical disk). It has been a practice to reproduce a signal from a high-density magneto-optical recording medium as mentioned above by an MSR (Magnetically Induced Super Resolution) method that irradiates laser light form a detection window in the reproducing layer of the magneto-optical recording medium so that a magnetic domain is transferred from the recording layer into the formed detection window, thereby carrying out signal reproduction.

Meanwhile, a technology of expanding and reproducing a magnetic domain has been developed, wherein alternating magnetic field is applied during reproducing signals from a magneto-optical recording medium so that the magnetic domain present in the recording layer can be expanded and transferred to the reproducing layer by the applications of laser light and alternating magnetic field, thus reproducing signals. There has been an proposal on a magneto-optical recording medium utilizing this technology to record and/or reproduce a signal of 14-G bytes.

The recording/reproducing apparatuses for a magneto-optical recording medium of this kind have been disclosed, for example, in Japanese Laid-open No. H6-295479 (Oct. 21, 1994) [G11B 11/10], Japanese Laid-open No. H8-7350 (Jan. 12, 1996) [G11B 11/10] and so on.

The magneto-optical recording medium 10, as shown in FIG. 1, includes a recording layer 14 and reproducing layer 16 formed by respective magnetic layers on a substrate 12. An intermediate layer 18 is formed between the recording layer 14 and the reproducing layer 16 while a protection layer 20 is formed on the recording layer 14. Incidentally, although the intermediate layer 18 herein is formed by a non-magnetic layer, it may be made by a magnetic layer. Also, the recording layer 14 and reproducing layer 16 can be formed of arbitrary known magnetic materials.

Referring to FIG. 2, microscopic record magnetic domains are recorded within the recording layer 14 of the magneto-optical recording medium 10 through the use of a magnetic head (not shown). During reproduction, the record magnetic domain 22 of the recording layer 14 is transferred into the reproducing layer 16 by illuminating laser light 24, as shown in FIG. 3.

Specifically, laser light 24 provides a temperature profile to the magneto-optical recording medium 10 as shown in FIG. 3. The temperature is highest at around a spot center but gradually decreased toward an outward thereof. It should be noted that, where the magneto-optical recording medium is for example a disk, the temperature profile is different in slant between forward and backward with respect to a moving direction of the magneto-optical recording medium. The temperature gradient is steeply slanted in a region of the disk entering into the laser spot as compared to that of a region exiting therefrom. By utilizing such a temperature profile, the magneto-optical recording medium 10 is increased in temperature up to a desired point.

Referring back to FIG. 2(A), if laser light 24 is illuminated onto the magneto-optical recording medium 10, the magneto-optical recording medium 10 is raised in temperature in accordance with the temperature profile as shown in FIG. 3. The reproducing layer 16 herein is formed by a magnetic layer that, at from room temperature to the Curie temperature Tc, is enriched in transition metal and assumes a perpendicular magnetic anisotropy film. Consequently, if laser light 24 is illuminated, the reproducing layer 16 is increased in temperature, being decreased in coercivity. Due to this, the record magnetic domain 22 within the recording layer 14 is transferred into the reproducing layer 16 through the intermediate layer 18 due to static magnetic coupling. Thus, a transferred magnetic domain 26 is formed within the reproducing layer 16. The transferred magnetic domain 26 is formed in a position corresponding to the record magnetic domain 22.

After forming a transferred magnetic domain 26 in the reproducing layer 16, an external magnetic field Hex as shown in FIG. 2(B) is applied through a not-shown magnetic head. This external magnetic field Hex is of an alternating magnetic field. This alternating magnetic field is applied for at lease 1 period, preferably 2–4 periods while one magnetic domain is passing through a hot spot 24a formed due to the laser light 24. The alternating magnetic field, or external magnetic field, if applied in the same direction (same polarity) as that of the transferred magnetic domain 26, causes the transferred magnetic domain 26 to expand in its diameter, thus forming expanded magnetic domains 26a and 26b. This results in transfer and expansion of the record magnetic domain 22. The transferred magnetic domain 26 with the expanded magnetic domains 26a and 26b are irradiated by laser light for reproduction through the optical head (not shown). Thus, a state is reproduced of magnetization within the reproducing layer 16, i.e. record signal.

In this manner, in the conventional magneto-optical recording medium recording/reproducing apparatus, irradiation of laser light is with an intensity that can cause transfer of a magnetic domain from the record layer into the reproducing layer.

For such a case, according to the experiments conducted by the present inventors, when only laser light was illuminated for reproduction without applying an alternating magnetic field Hex, a reproduced signal obtained had a waveform as shown in FIG. 4(A). In this state, when an alternating magnetic field was applied, a reproduced signal obtained had a waveform as shown in FIG. 4(B). However, the reproduced signal of FIG. 4(B) is not satisfactorily high in level. Thus, there has encountered a limitation in reproducing a signal when the record density is to be tried to increase.

SUMMARY OF THE INVENTION

It is therefore a primary object of the present invention to provide a novel apparatus and method for reproducing with a magneto-optical recording medium.

Another object of the invention is to provide a apparatus and method for reproducing with a magneto-optical recording medium which is capable of increasing the intensity of a reproduced signal.

Still another object of the invention is to provide a method for reproducing with a magneto-optical recording medium and magneto-optical disk apparatus which can optimally set a power level of laser light.

A reproducing apparatus according to the present invention is a reproducing apparatus for a magneto-optical recording medium to transfer, during reproduction, a magnetic domain recorded within a recording layer into a reproducing layer, characterized in that a magnetic domain is transferred with expansion from the recording layer to the reproducing layer by applying alternating magnetic field to the magneto-optical recording medium in a state that the predetermined intensity of laser light is illuminated to the magneto-optical recording medium.

A reproducing method according to the invention is a method of reproducing with a magneto-optical recording medium to transfer, during reproduction, a magnetic domain recorded within a recording layer into a reproducing layer, comprising: (a) illuminating laser light with a predetermined intensity not to cause transfer of the magnetic domain from the recording layer to the reproducing layer; and thereafter (b) applying alternating magnetic field to the magneto-optical recording medium, whereby the magnetic domain is transferred with expansion from the recording layer to the reproducing layer.

The magneto-optical recording medium is formed with a particular region, for example, for each sector or zone. This particular region is previously formed with a signal to adjust an intensity of laser light to be illuminated to the magneto-optical recording medium through the optical means.

In this invention, the optical means includes an intensity adjusting means to set a laser light intensity to a degree that the signal of the particular region cannot be reproduced only by laser light. Laser light thus adjusted in intensity is illuminated through the optical means to the magneto-optical recording medium. Thereafter, a magnetic field applying means applies magnetic field to the magneto-optical recording means. As a result, the record magnetic domain recorded in the recording layer of the magneto-optical recording medium is transferred with expansion to the reproducing layer. That is, if alternating magnetic field is applied in a state that laser light is illuminated with an intensity at which no transfer of the record magnetic domain can be caused to the reproducing layer, there occur concurrent transfer and expansion of the record magnetic domain to the reproducing layer. As a result, the record magnetic domain is transferred with expansion.

According to this invention, because transfer and expansion of a magnetic domain is effectively made from the recording layer to the reproducing layer, a reproduced signal is increased in level. Consequently, the record magnetic domain in the recording layer can be reduced in size, enabling recording with higher density.

A second reproducing method according to the invention is a method of reproducing a signal from a magneto-optical recording medium by using laser light and an alternating magnetic field, including a first step and a second step. In the first step, a power level of laser light is determined based on a reproduced signal obtained by reproducing from the magneto-optical recording medium with using laser light and alternating magnetic field, and on a record signal. In the second step, a signal is reproduced from the magneto-optical recording medium by using the laser light set at a power level determined by the first step and an alternating magnetic field.

According to the second reproducing method, the record signal recorded in the magneto-optical recording medium is reproduced by magnetic domain expansion so that a power level of laser light is determined based on the reproduced signal and record signal. It is therefore possible to accurately determine a power level. Further, magnetic domain expansion and reproduction can be made suited for a loaded magneto-optical recording medium.

A third reproducing method according to the invention is a method for reproducing a signal from a magneto-optical recording medium by using laser light and alternating magnetic field, including a first step, a second step, a third step and a fourth step. In the first step, a predetermined record signal is recorded to the magneto-optical recording medium. In a second step, the signal recorded in the first step is reproduced while changing a power level of laser light. In the third step, a signal reproduced in the second step is compared with the record signal and determining a power level of laser light at which the reproduced signal is substantially coincident with the record signal. In the fourth step, a signal is reproduced from the magneto-optical recording medium by using laser light set in the power level determined in the third step and alternating magnetic field.

According to the third reproducing method, a predetermined record signal is actually recorded in a magneto-optical recording medium. A power level of laser light to be illuminated is determined such that a reproduced signal, obtained by performing magnetic domain expansion and reproduction on the recorded signal while changing laser light power level, becomes coincident with the record signal. Accordingly, even where the magneto-optical recording medium loaded is not recorded with a signal to determine a laser light power level, it is possible to accurately determine a power level suited for the loaded magneto-optical recording medium. Also, accurate magnetic domain expansion and reproduction are possible using a determined power level of laser light.

A fourth reproducing method according to the invention is a method of reproducing a signal from a magneto-optical recording medium by using laser light and alternating magnetic field, including a first step, a second step, a third step and a fourth step. In the first step, a predetermined record signal is recorded in a calibration region provided in the magneto-optical recording medium. In the second step, the record signal is reproduced from the calibration region while changing a power level of laser light, by using laser light and alternating magnetic field. In the third step, a signal reproduced in the second step is compared with the record signal and determining a power level of laser light at which the reproduced signal is substantially coincident with the record signal. In the fourth step, a signal is reproduced from the magneto-optical recording medium by using laser light set in the power level determined in the third step and alternating magnetic field.

According to the fourth reproducing method, the magneto-optical recording medium has a calibration region.

The calibration region is actually recorded with a predetermined record signal so that magnetic expansion and reproduction is made on the recorded signal to determine a power level of laser light for signal reproduction. Accordingly, a power lever of laser light to be illuminated for reproduction can be determined without using a region to be recorded with a signal. Also, if a calibration region is placed such that laser light reaches a usual signal recorded region after passing the calibration region, it is possible to determine a power level of laser light to be illuminated prior to reproducing the usual signal. Furthermore, where a plurality of calibration regions are provided in a radial direction of the magneto-optical recording medium, even if the magnetic material be uneven in magnetic characteristic over a disk substrate, magnetic domain expansion and reproduction can be implemented in a manner suited for the magnetic characteristic.

Incidentally, in the third and fourth reproducing methods, the change in laser light power level in the second step is desirably performed within a range that no magnetic domain transfer is made only by laser light from the recording layer to the reproducing layer. By doing so, a laser light power level is determined within a range that no magnetic domain transfer is made only by laser light from the recording layer to the reproducing layer. It is therefore possible to accurately determine a power level suited for magnetic domain expansion and reproduction.

A magneto-optical disk apparatus according to the invention is a magneto-optical disk apparatus for recording and/or reproducing a signal to and/or from a magneto-optical recording medium by using laser light and magnetic field, comprising: a determination circuit for determining a power level of laser light based on a predetermined record signal and a signal reproduced of the predetermined record signal from the magneto-optical recording medium by using laser light and alternating magnetic field.

In this magneto-optical disk apparatus, the determination circuit determines a power level of laser light based on a signal reproduced using laser light and alternating magnetic field as well as a record signal as a basis of the reproduced signal. Accordingly, it is possible to promptly and accurately determine whether the reproduced signal is correct or not. As a result, a laser light power level can be determined with rapidity and accuracy.

A second magneto-optical disk apparatus according to the invention is a magneto-optical disk apparatus for recording and/or reproducing a signal to and/or from a magneto-optical recording medium by using laser light and magnetic field, comprising: a determination circuit for determining a power level of laser light based on the reproduced signal while changing the power level of laser light such that a signal produced of the record signal becomes substantially coincident with the record signal.

According to the second magneto-optical disk apparatus, the loaded magneto-optical recording medium is previously recorded with a signal to determine a laser light power level suited for magnetic domain expansion and reproduction. The recorded signal is reproduced by magnetic domain expansion while changing the laser light power level. If the power of laser light is too intense or weak, there is no agreement between the reproduced signal and the record signal. The determination circuit determines, as an optimal laser light power level, a power level that the reproduced signal substantially agrees with the record signal. It is therefore possible to determine an optimal laser light power lever with rapidity. Thus, a power level can be determined suited for the loaded magneto-optical recording medium.

A third magneto-optical disk apparatus according to the invention is a magneto-optical disk apparatus for recording and/or reproducing a signal to and/or from a magneto-optical recording medium by using laser light and magnetic field, comprising: an optical head, a magnetic head and a determination circuit. The optical head illuminates laser light to the magneto-optical recording medium and detects reflection light thereof. The magnetic head applies magnetic field to the magneto-optical recording medium. The determination circuit determines a power level of laser light based on a record signal in the magneto-optical recording medium and a reproduced signal of the record signal detected by the optical head while applying alternating magnetic field through the magneto-optical head and changing a power level of laser light, so that the reproduced signal becomes substantially coincident with the record signal.

According to the third magneto-optical disk apparatus, the alternating magnetic field for determining a laser light power level is applied through the magnetic head to the magneto-optical recording medium while laser light is illuminated through the optical head to the magneto-optical recording medium. Even in a structure having a magnetic head and an optical head arranged sandwiching the magneto-optical recording medium, a laser light power level suited for magnetic domain expansion and reproduction can be determined with rapidity and accuracy.

A fourth magneto-optical disk apparatus according to the invention is a magneto-optical disk apparatus for recording and/or reproducing to and/or from a magneto-optical recording medium by using laser light and magnetic field, comprising an optical head, a laser drive circuit, a magnetic head and a determination circuit. The optical head illuminates laser light to the magneto-optical recording medium and detects reflection light thereof. The laser drive circuit drives a laser light source included in the optical head. The magnetic head applies magnetic field to the magneto-optical recording medium. The determination circuit outputs a drive signal to the laser drive circuit to change a power level of laser light to be emitted through the optical head, and determines a power level of laser light based on a predetermined record signal recorded to the magneto-optical recording medium, alternating magnetic field applied through the magnetic head and a signal reproduced of the record signal detected by laser light emitted through the optical head based on the drive signal, so that the reproduced signal becomes substantially coincident with the record signal.

According to the fourth magneto-optical disk apparatus, a drive signal is outputted from the determination circuit to the laser drive circuit, to change a power level of laser light to be emitted through the optical head. Based on the drive signal, the laser drive circuit drives a laser light source included in the optical head so that laser light different in power level is illuminated to the magneto-optical recording medium. Consequently, a reproduced signal can be detected by performing magnetic domain expansion and reproduction while changing the power level on the magneto-optical recording medium. Based on the reproduced signal, a power level of laser light is determined. As a result, it is possible to accurately determine a laser light power level.

A fifth magneto-optical disk apparatus according to the invention is a magneto-optical optical disk apparatus for recording and/or reproducing a signal to and/or from a magneto-optical recording medium by using laser light and magnetic field, comprising an optical head, a laser drive circuit, a magnetic head, a magnetic head drive circuit and a determination circuit. The optical head illuminates laser light to the magneto-optical recording medium and detecting reflection light thereof. The laser drive circuit drives laser light source included in the optical head. The magnetic head applies magnetic field to the magneto-optical recording medium. The magnetic head drive circuit drives the magnetic head. The determination circuit outputs to the magnetic head drive circuit a first drive signal to record a predetermined record signal in the magneto-optical recording medium and to the laser drive circuit a second drive signal to change a power level of laser light to be emitted through the optical head, and determines a power level of laser light based on a predetermined record signal recorded based on the first drive signal, alternating magnetic field applied through the magnetic head, and a signal reproduced of the record signal detected by laser light emitted through the optical head based on the second drive circuit, so that the reproduced signal becomes substantially coincident with the record signal.

According to the fifth magneto-optical disk apparatus, the determination circuit outputs to the magnetic drive circuit a first drive signal to record a predetermined record signal for determining a laser light power level. Based on the first drive signal, a predetermined record signal is recorded on the magneto-optical recording medium. Also, the determination circuit output to the laser drive circuit a signal to change the laser light power level. The laser drive circuit drives a laser light source in the optical head based on the second drive signal. Thus, laser light different in power level is illuminated to the magneto-optical recording medium, reproducing the predetermined record signal through magnetic domain expansion. Accordingly, even where the loaded magneto-optical recording medium is previously not recorded with a predetermined record signal, it is possible to rapidly and accurately determine a laser light power level suited for the loaded magneto-optical recording medium.

In the fifth magneto-optical disk apparatus, the determination circuit, after loading the magnet-optical recording medium, outputs to the magnetic head drive circuit a first drive signal to record a predetermined record signal for determining a laser light power level after loading the magneto-optical recording medium but before recording the record signal, and to the laser drive circuit a second drive signal to change the power level of laser light to be emitted through the optical head before reproducing the record signal. By doing so, prior to recording a usual signal, a first drive signal is outputted from the determination circuit to the magnetic head drive circuit to record the predetermined record signal for determining a laser light power level. Based on the first drive signal, the predetermined record signal is recorded on the magneto-optical recording medium. Also, a second signal is outputted from the determination circuit to the laser drive circuit to change the laser light power level. Magnetic domain expansion and reproduction is made on the predetermined record signal already recorded while changing the laser light power level. Based on a signal reproduced, a laser light power level is determined. Accordingly, it is possible to positively determine a laser light power lever suited for magnetic domain expansion and reproduction before reproduce operation on the usual signal. Thus, the usual signal can be accurately effected of magnetic domain expansion and reproduction.

The above described objects and other objects, features, aspects and advantages of the present invention will become more apparent from the following detailed description of the present invention when taken in conjunction with the accompanying drawings.

BRIEF DESCRIPTION OF THE DRAWINGS

FIG. 2 is an illustrative view showing a conventional method to reproduce a record magnetic domain recorded in a recording layer of the magneto-optical recording medium of FIG. 1, wherein FIG. 2(A) is before expansion while

FIG. 4 is a waveform diagram showing examples of reproduced signals respectively obtained in stages of transfer and expansion in the prior art of FIG. 2, wherein

FIG. 15 is an illustrative view representing that the record magnetic domain in the recording layer is expanded and transferred to the reproducing layer in the FIG. 5 embodiment, wherein FIG. 15(A) shows that no transfer is made in a state of merely illuminating laser light while

FIG. 20 is an illustrative view showing a principle of magnetic domain expansion and reproduction similar to FIG. 2;

BEST FORM FOR PRACTICING THE INVENTION

Figure 1:
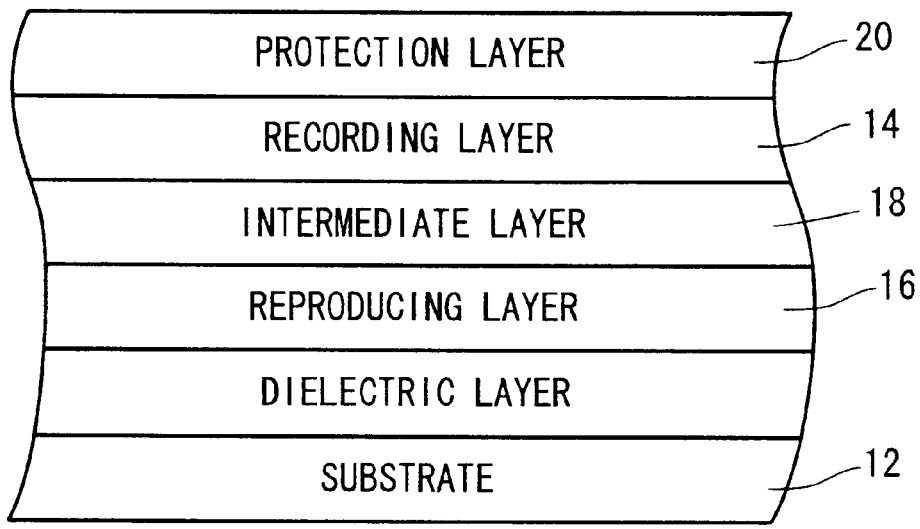
FIG. 1 is a sectional illustrative view showing one example of a magneto-optical recording medium used in the present invention.
Figure 5:
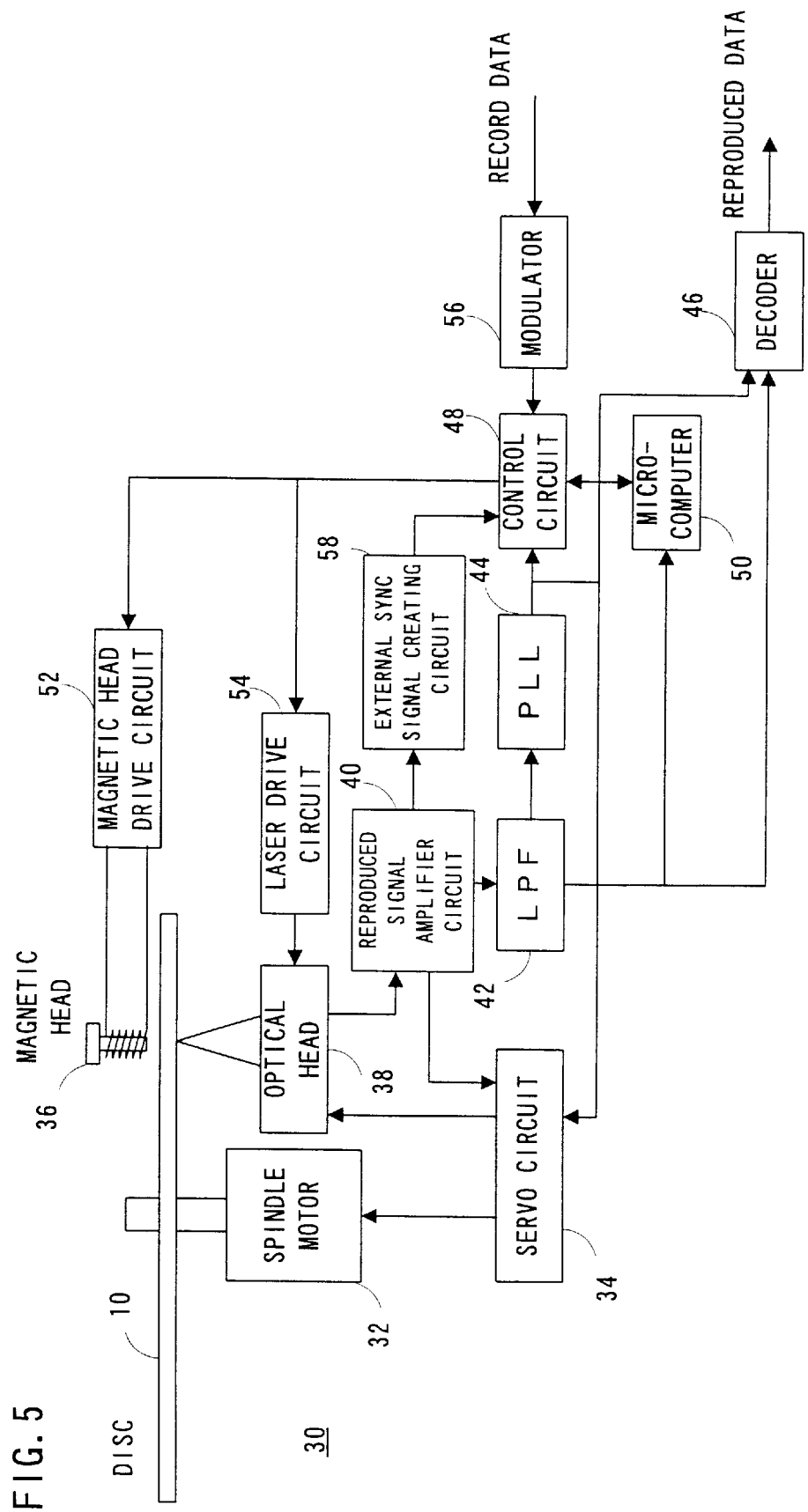
FIG. 5 is a block diagram showing one embodiment of the invention.

Referring to FIG. 5, an apparatus 30 for recording/reproducing with a magneto-optical recording medium in this embodiment includes a spindle motor 32 to rotate a magneto-optical recording medium, or disk, 10. The spindle motor 32 is controlled by a servo circuit 34. A magnetic head 36 is provided above the magneto-optical recording medium, or disk, 10 which is not in contact with the disk 10. At an underneath of the disk, an optical head 38 is provided similarly. The magnetic head 36, as hereinafter referred to, is utilized not only to form a record magnetic domain 22 (FIG. 2) in a recording layer 14 (FIG. 1) of the disk 10 but also to apply alternating magnetic field to expand and transfer a record magnetic domain 22 into a reproducing layer 16. The optical head 38 includes, as well known, a laser device, a light receiving element, a polarizing beam splitter and so on. The laser device (not shown) is to illuminate laser light onto the magneto-optical recording medium, or disk, 10 during reproduction. It should be noted that in this embodiment the intensity of laser light is set different from that of the conventional, as will be discussed later. That is, conventionally laser light has been set to such an intensity that it by itself causes transfer of a record magnetic domain into the reproducing layer 16 as explained before. However, this embodiment sets the intensity of laser light to a degree that no record magnetic domain is transferred by merely illuminating laser light to the magneto-optical recording medium 10. Two light receiving elements, e.g. photo-diodes, detect respective polarizing axes of reflection light that differ depending upon a polarity of magnetization an expanded, transferred magnetic domain within the reproducing layer 16, thereby outputting a reproduced signal (RF signal).

The reproduced signal from the optical head 38 is supplied to a reproduced signal amplifier circuit 40. The reproduced signal amplifier circuit 40 supplies tracking error and focus error signals contained in the reproduced signal to a servo circuit 34. The servo circuit 34 controls the spindle motor 32 to rotate at a predetermined rotational speed and an objective lens (not shown) included in the optical head 38, in response to the tracking and focus signals as well as a clock signal (hereinafter stated). That is, servo circuit 34 performs tracking servo and focus servo.

The reproduced signal having been amplified by the reproduced signal amplifier circuit 40 is passed through a low-pass filter 42 and then delivered to a PLL (Phase-Locked Loop) 44, i.e. as clock creating circuit, and to a decoder 46. The PLL 44 adjusts the phase and frequency of an oscillation clock depending upon a phase comparison between a reproduced clock contained in the reproduced signal and an oscillation clock given from the VCO (Voltage-Controlled Oscillator: not shown), thus outputting an oscillation clock as a system clock. The system clock is given to the servo circuit 34 as stated above and to a control circuit 48 and decoder 46. The decoder 46 decodes an output signal (reproduced signal) from the low-pass filter 42 according to the clock, and outputs reproduced data.

The control circuit 48 under control of a microcomputer 50 controls the magnetic head drive circuit 52 and laser drive circuit 54. The magnetic head drive circuit 52 includes a pulse signal source (not shown) to generate a pulse signal for writing a record magnetic domain into the recording layer 14 (FIG. 1) through the magnetic head 36, and an alternating current signal source (not shown) to generate an alternating magnetic field through the magnetic head 36. That is, the control circuit 48 is given modulated record data from a modulator 56. The control circuit 48 supplies a signal to magnetic head drive circuit 52, according to the modulated record data. In response, the magnetic head drive circuit 52 controls the pulse signal source, and supplies drive signal to the magnetic head 36 so that a record magnetic domain can be recorded in the recording layer of the magneto-optical recording medium, or disk, 10 in according with the record data. Incidentally, the alternating current signal outputted by the alternating current source, i.e. an alternating magnetic field, has a frequency, for example, of 2.0 MHz in this embodiment. However, it should be noted that the frequency can be arbitrarily varied.

Figure 6:
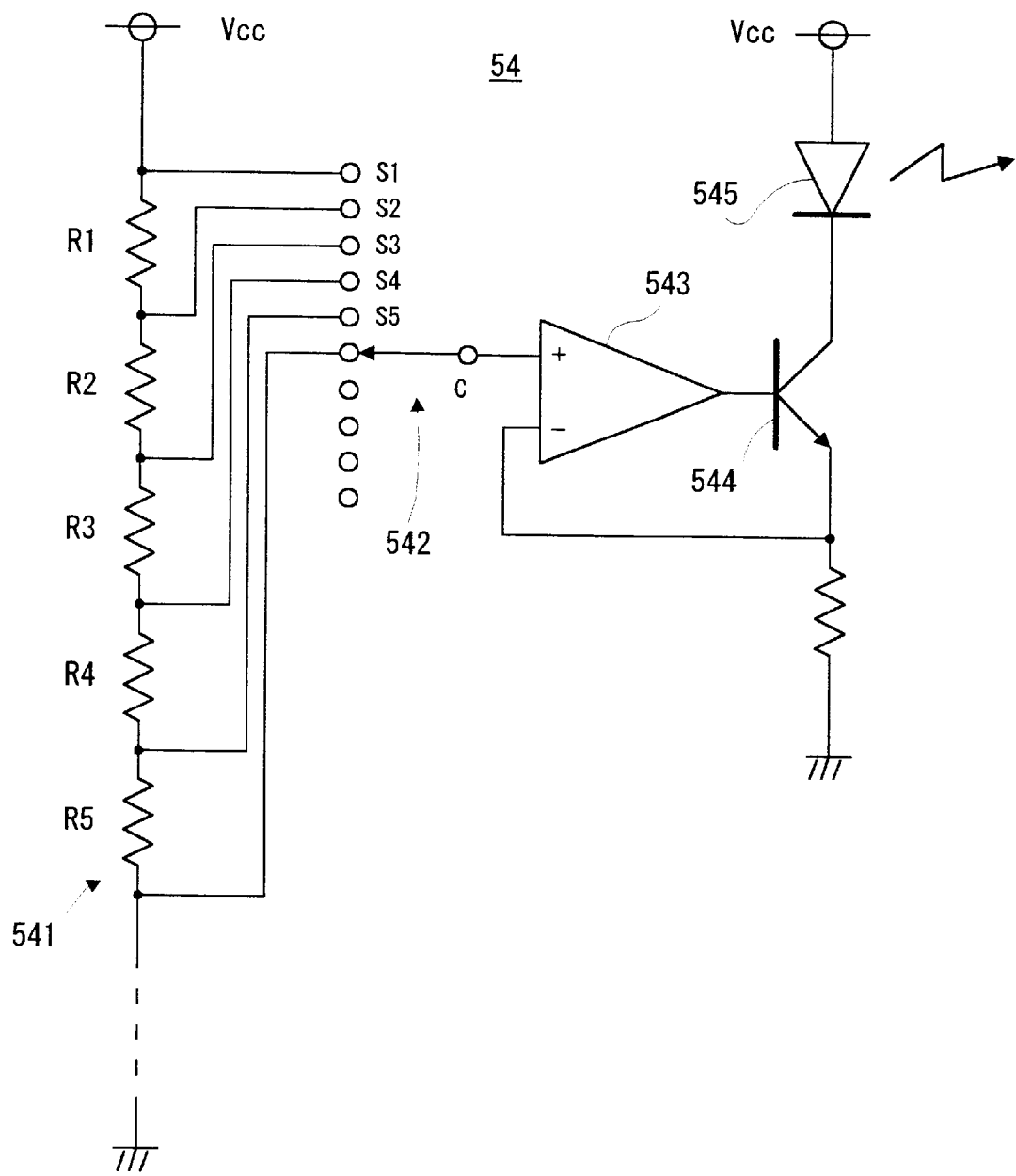
FIG. 6 is a circuit diagram showing an example of laser drive circuit in the FIG. 5 embodiment.

The laser drive circuit 54 includes, as concretely shown in FIG. 6, a plurality of resistors R1, R2, R3, ... connected in series between a power source Vcc and a ground. The resistors R1, R2, R3, ... has series connection points connected with respective fixed contacts S1, S2, S3, ... of a switch 542. The switch 542 has a movable contact switch that is switched to any of the fixed contacts S1, S2, S3, ... . according to a switch signal given from the control circuit 48. Accordingly, the switch 542 at its movable contact C outputs a different voltage depending upon which fixed contact the movable contact is connected to. The output voltage of the switch 542 is given to a base of a transistor 544 through an amplifier 543. A laser device 545 is connected between a collector of the transistor 544 and the power voltage Vcc while an emitter of the transistor 544 is ground through an emitter resistance.

In this laser drive circuit 54, the movable contact C of the switching of the switch 542 if switched by the control circuit 48 causes change of an output voltage of the amplifier 543, i.e. a base voltage of the transistor 544, thereby changing a drive current to the laser device 545. Accordingly, it is possible to adjust an output of laser light emitted by the laser device 545.

Meanwhile, the reproduced signal passed via the low-pass filter 42 is further delivered to the microcomputer 50. The microcomputer, as will be discussed later, controls the laser drive circuit 54 to set the power or intensity of laser light depending upon whether a reproduced signal is obtained from the low-pass filter 42 or not.

For the recording/reproducing apparatus 30 of this embodiment, a particular region 11 is formed on the magneto-optical recording medium, or disk, 10 as shown in FIG. 7 to FIG. 10. The particular region 11 is to adjust a laser light output by reproducing a record signal out of the same region. It should be noted that it is possible for a reproduction exclusive apparatus without having recording function to utilize a magneto-optical recording medium or disk previously formed with such a particular region.

Figure 7:
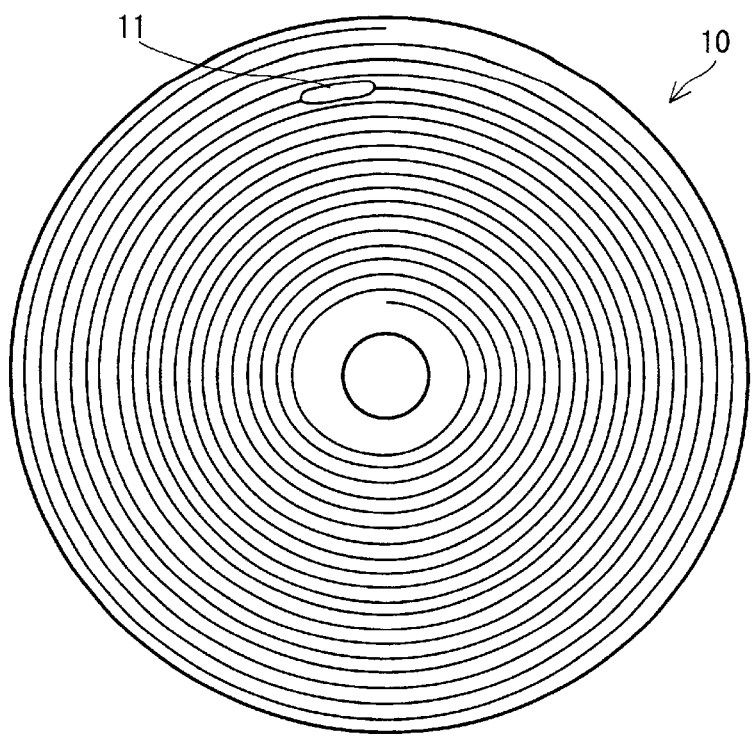
FIG. 7 is an illustrative view showing an example in arrangement of a particular region for laser light magneto-optical recording medium intensity adjustment formed on a disk.
Figure 8:
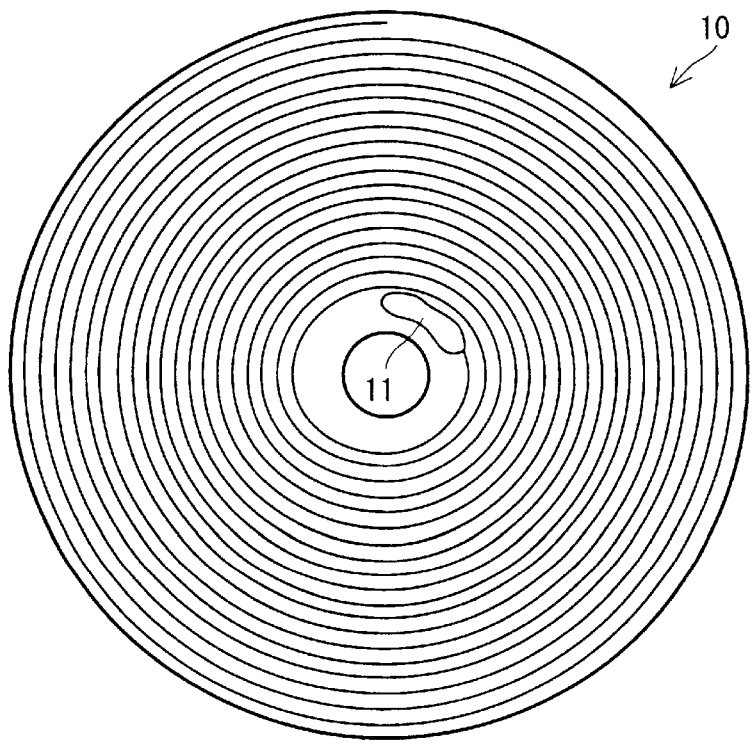
FIG. 8 is an illustrative view showing another embodiment in arrangement of a particular region.
Figure 9:
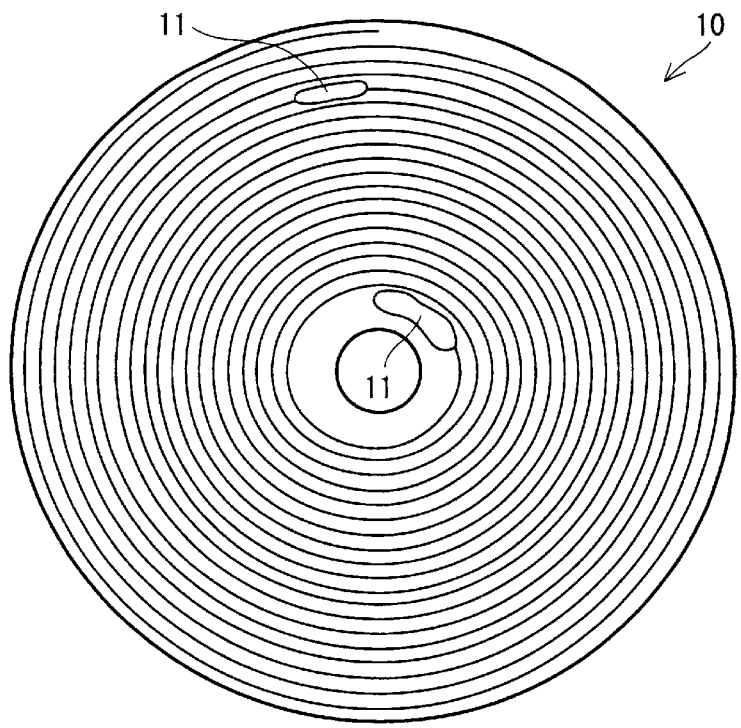
FIG. 9 is an illustrative view showing still another example in arrangement of a particular region.

In the FIG. 7 embodiment, a particular region 11 is formed in a position immediately following a TOC region provided on an outer peripheral side of the disk 10. In an embodiment of FIG. 8, a particular region 11 is formed in an end position of the disk 10. In an embodiment of FIG. 9, particular regions 11 are formed in respective positions of immediately following a TOC region and an end of the disk 10. In an embodiment of FIG. 10, particular regions 11 are set in respective beginning positions of zones. That is, the particular regions 11 are formed for each zone or sector.

Figure 10:
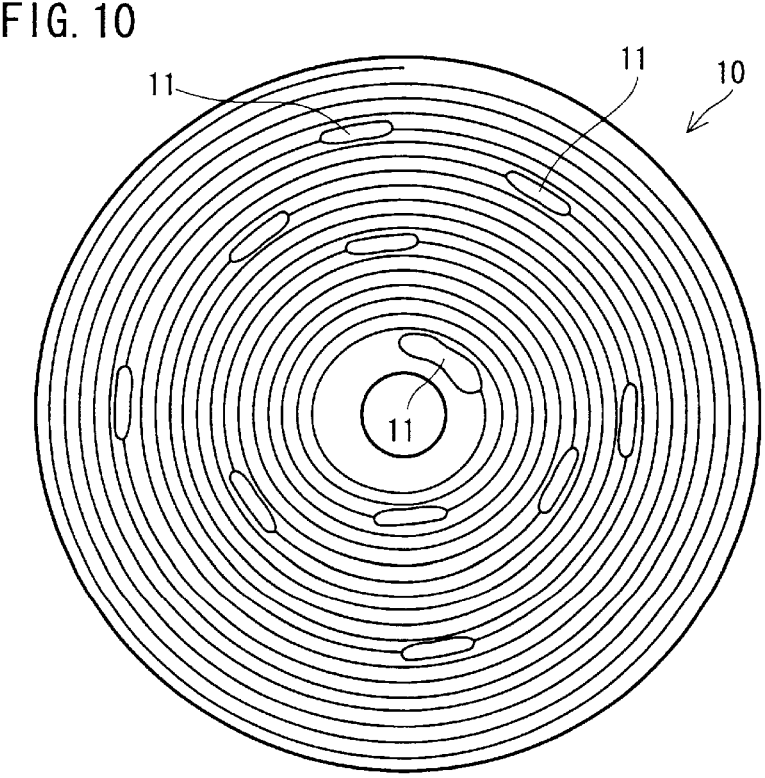
FIG. 10 is an illustrative view showing a further example in arrangement of particular region.

By utilizing a disk 10 formed with such a particular region 11, the adjustment of laser light intensity can be implemented at arbitrary timing. For example, it is possible to conduct adjustment on intensity to determine an optimized output of laser light at initializing the disk. Or otherwise, laser light intensity adjustment can be performed at a time at the disk 10 is loaded on a recording/reproducing apparatus or reproducing apparatus. In particular, if the disk of FIG. 10 is utilized, the laser light output can be optimized each time reproduction is effected for each zone.

Figure 11:
FIG. 11 is an illustrative view showing an external magnetic field (pulses) to be outputted through a magnetic head during forming a particular region.
Figure 12:
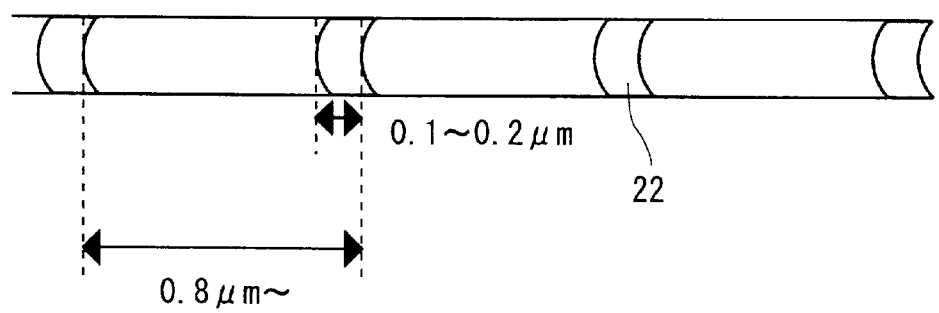
FIG. 12 is an illustrative view showing a record magnetic domain formed in a particular region of a recording layer.

Now explained is a method to form a particular region 11 based on the FIG. 5 embodiment. When forming a particular region, the microcomputer 50 sets a test signal record mode. In this mode the microcomputer 50 provides an instruction signal to the control circuit 48 to output a test signal. The control circuit 48, in turn, enables a pulse signal source (not shown) of the magnetic head drive circuit 52. Consequently, the magnetic head drive circuit 52 supplies a pulse signal as shown in FIG. 11 to the magnetic head 36. That is, the magnetic head 36 applies an external magnetic field onto the disk 10 in response to an intermittent pulse signal as shown in FIG. 11. Consequently, record magnetic domains 22 are formed in the recording layer 14 (FIG. 1) of the disk 10, as shown in FIG. 12. The record magnetic domain 22 has a size corresponding to a minimum magnetic domain with which recording/reproducing is possible on the disk. The interval of the record magnetic domains 22 is selected greater than a spot diameter 24a (FIG. 2) of laser light 24. That is, the test signal magnetic domains recorded in the recording layer 14 at a particular region 11 are isolated magnetic domains having an interval greater than a laser light spot diameter. Incidentally, in the FIG. 11 embodiment the record magnetic domains has a size, for example, of approximately 0.1–0.2 $\mu$m and an interval set, for example, equal to or longer than 0.8 $\mu$m.

Figure 13:
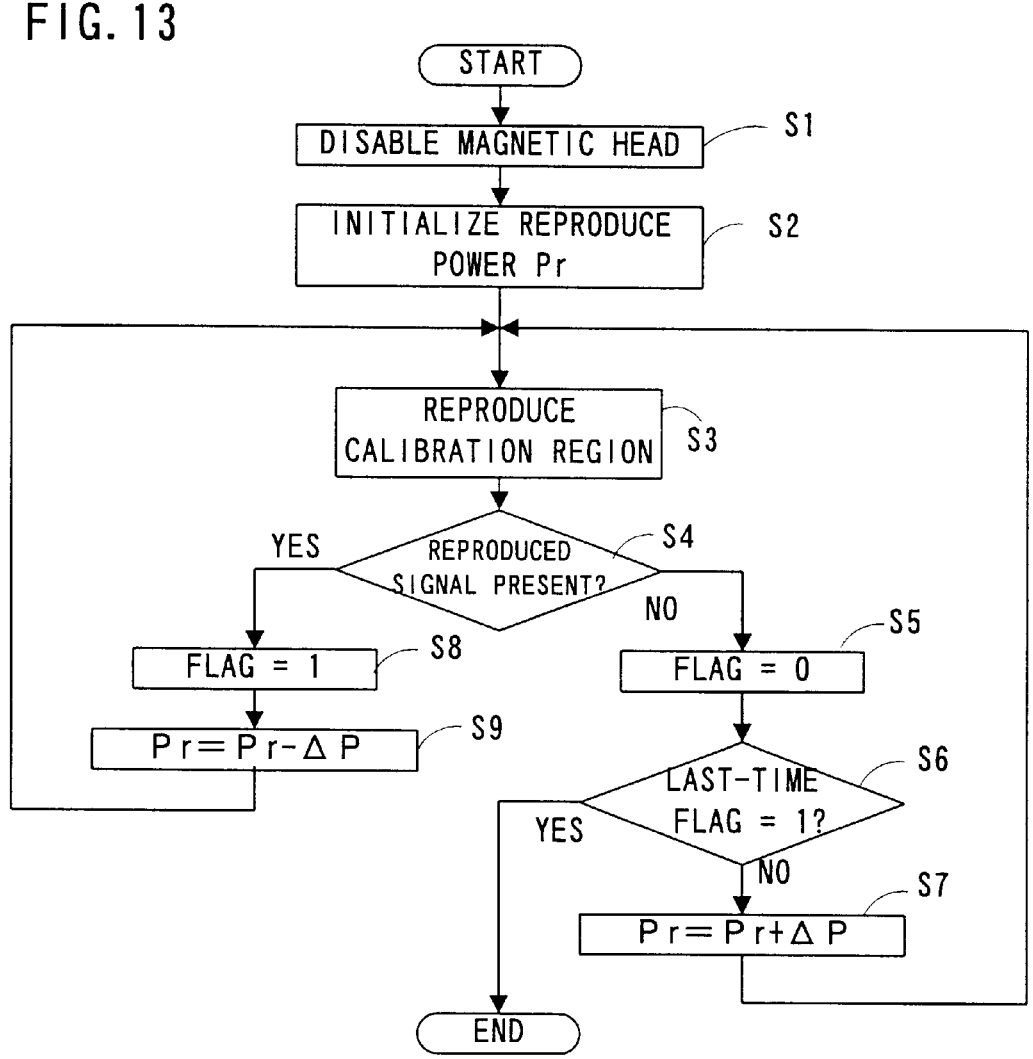
FIG. 13 is a flowchart showing an intensity adjustment mode in the FIG. 5 embodiment.
Figure 14:
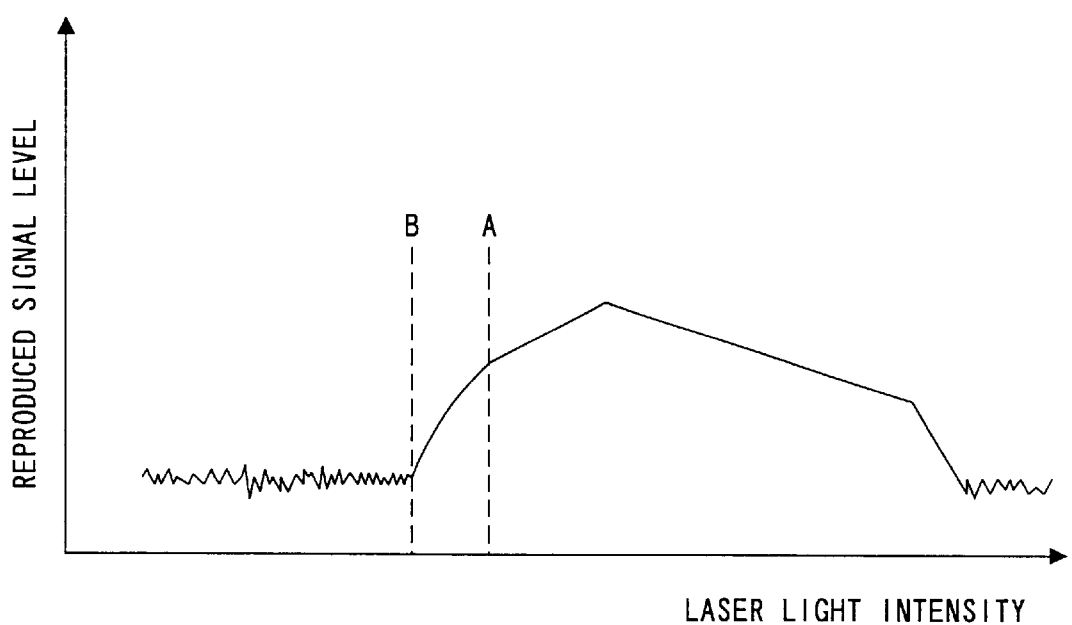
FIG. 14 is a graph representing that the reproduced signal is changed in level depending upon change in intensity of laser light in the FIG. 5 embodiment.

Now an intensity adjustment mode is explained with reference to FIG. 13 and FIG. 14, wherein the laser light output is optimized using a disk 10 formed with a particular region 11 (FIG. 7 to FIG. 10). FIG. 14 is a graph showing a relationship between a laser light intensity and a reproduced signal. In the embodiment the laser light intensity is set to an intensity B around which no reproduced signal is obtainable in FIG. 14.

In the intensity adjustment mode, if disk 10 is loaded, the microcomputer 50 in the first step S1 disables the magnetic head 36. The microcomputer 50 in the next step S2 performs initial setting on an output Pr of laser light 24. Although the output initial value is set for example at approximately 0.6 mW, it is possible to arbitrarily set the initial value.

After setting an initial value as above, the microcomputer 50 in step S3 performs production on a test signal magnetic domain recorded as described above in the particular region 11 (FIG. 7 to FIG. 10). That is, the microcomputer 50 enables the laser drive circuit 54 through the control circuit 48 similarly to usual reproduction, to drive the laser device 545 (FIG. 6) with the initial power set in the former step S2.

Figure 3:
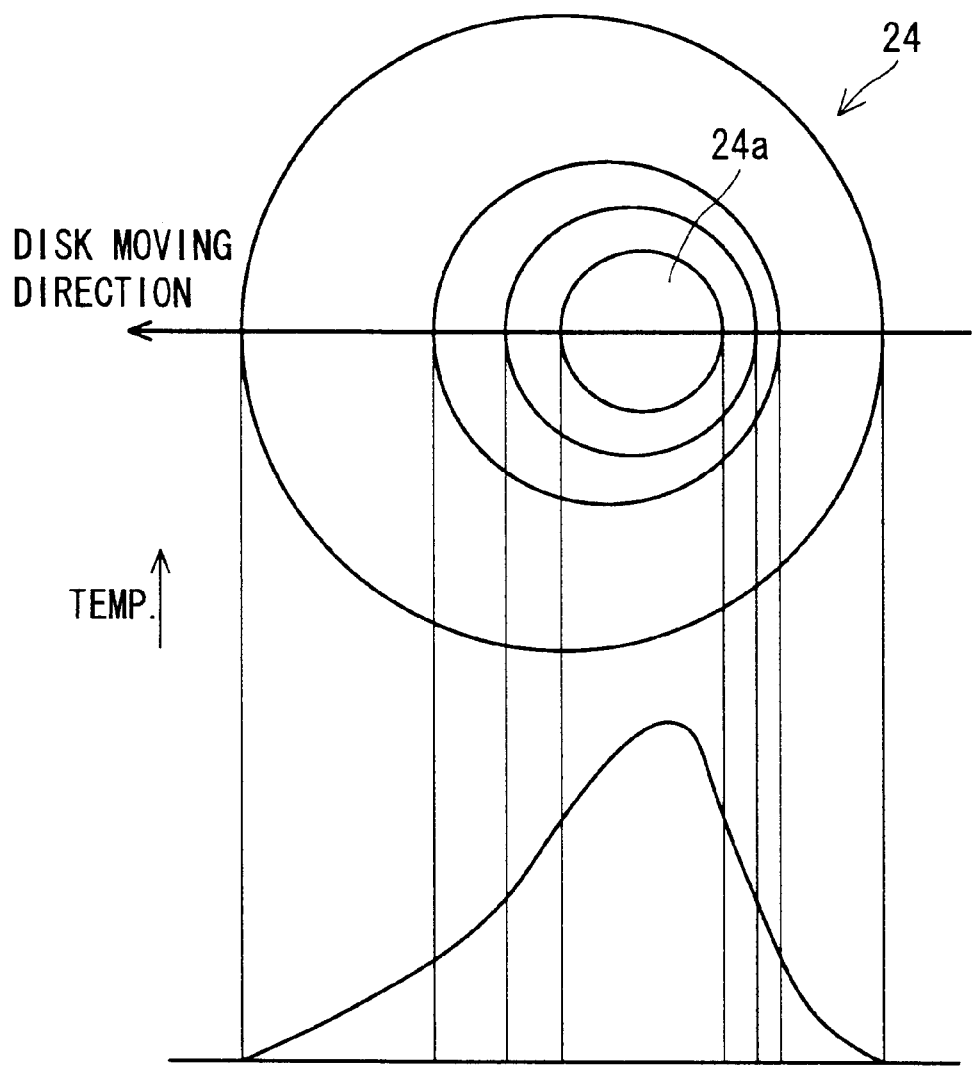
FIG. 3 is an illustrative view showing a spot and temperature distribution of laser light illuminated during reproducing with the magneto-optical recording medium.

Due to drive to the laser device 545, laser light 24 (FIG. 3) is outputted from the optical head 38. Then, the microcomputer 50 in step S4 determines whether a reproduced signal was obtained, based on a signal given from the low-pass filter 42.

If there was no reproduced signal, in step S5 the flag is set to "0". In the succeeding step S6 it is determined whether the preceding flag was "1" or not. When the flag in the preceding time was not "1", i.e. when no reproduced signals were successively detected, in step S7 a switch signal is given to the switch 542 of the laser drive circuit 54 in order to increase the laser light output, specifically to decrease the resistance value of the FIG. 6 circuit. Then, returning again to the step S3, the microcomputer in step S4 detects on the presence or absence of a reproduced signal in a manner similarly to the above.

Where there is a reproduced signal, the flag is set to "1" in step S8, and in the succeeding step S9 a switch signal is given to the switch 542 of the laser drive circuit 54 to reduce the laser light output. Returning again to the step S3, the microcomputer in step S4 detects on the presence or absence of a reproduced signal, similarly to the above.

In the case that no reproduced signal is detected after obtaining a reproduced signal, "YES" is determined in the step S6. Accordingly, the laser light intensity at that time is set as an optimal power.

Referring to FIG. 14, when the laser light intensity becomes a certain value, the reproduced signal is increased in level. However, the laser light intensity if excessively high results in decrease in the reproduced signal level. This is because the temperature of the magneto-optical recording medium 10 is brought close to the Curie point due to intensive laser light and the reproducing layer 16 is reduced in coercivity.

In FIG. 14, when the laser light with intensity denoted at a point A is illuminated, the reproduced signal is high in level. Accordingly, in this case it can be understood that transfer of a record magnetic domain occurs to the reproducing layer 16. Meanwhile, because at a point B no reproduced signal is obtained, no transfer of a magnetic domain occurs to the reproducing layer. In this embodiment the laser light intensity is set to the point B according to the flowchart of FIG. 13 explained above. Setting is within a range of 80 to 100% with the power at the point B taken as a reference.

Figure 15A:
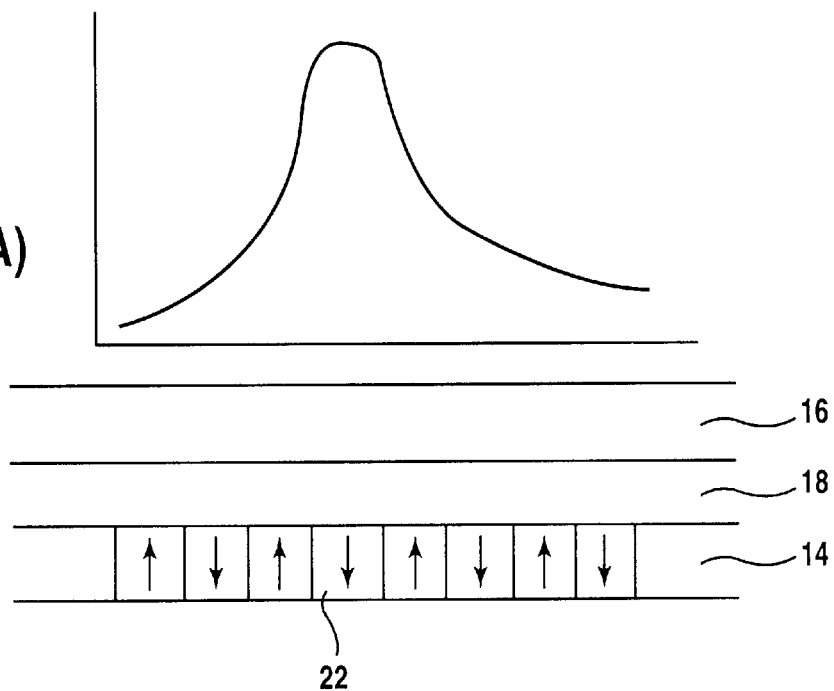
Figure 15B:
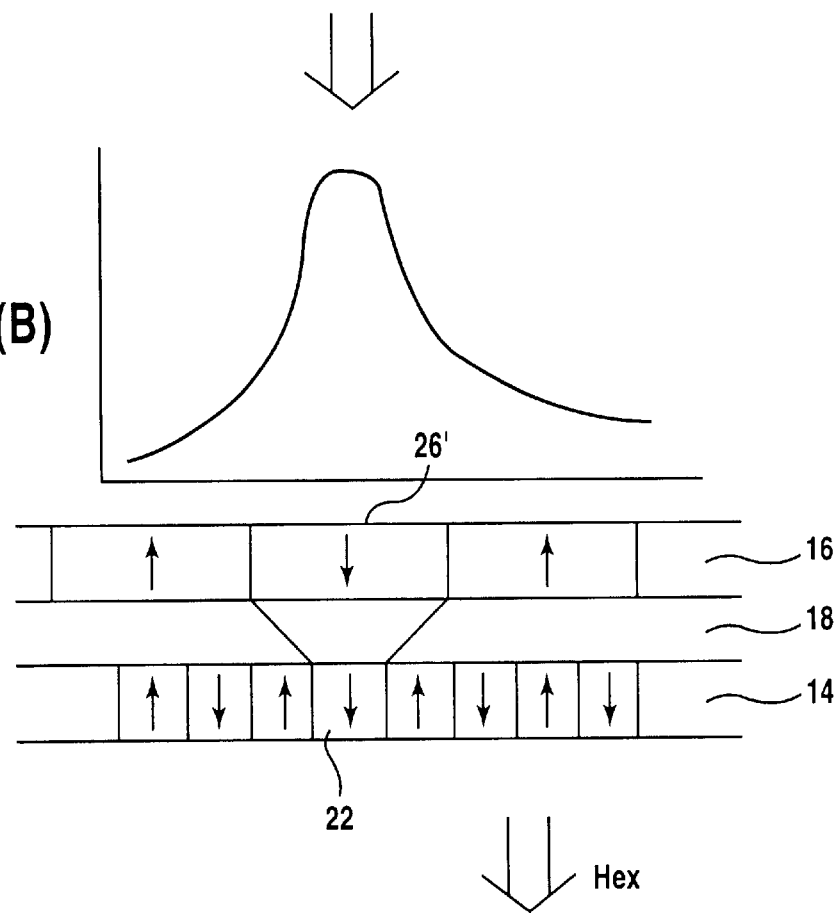
FIG. 15(B) shows that expansion and transfer are effected by applying an alternating magnetic field.
Figure 16:
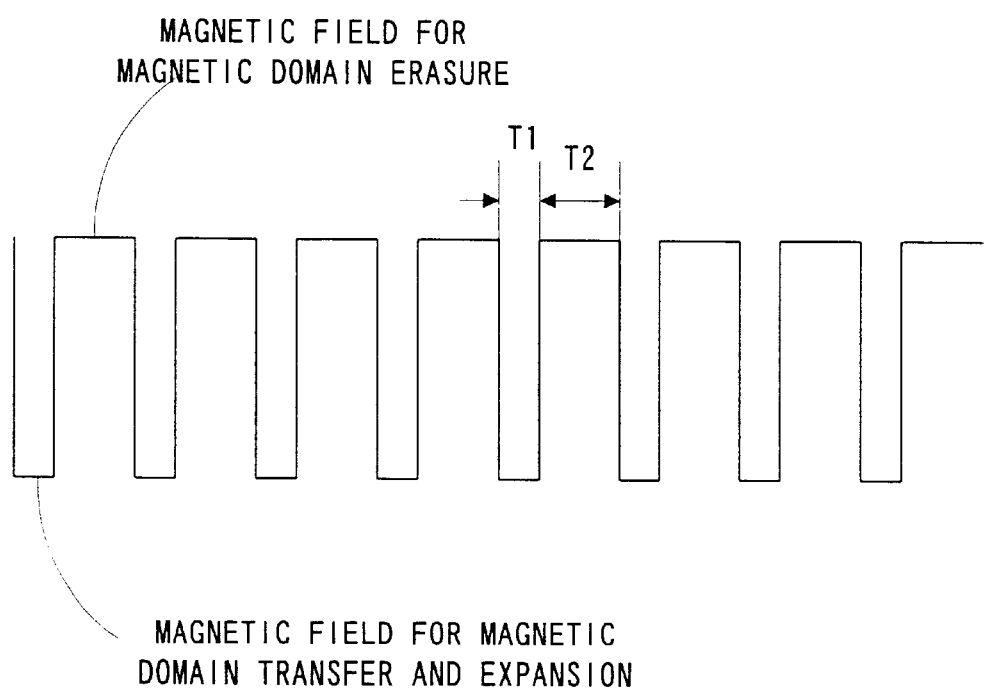
FIG. 16 is a waveform diagram showing an alternating magnetic field to be applied to a disk through a magnetic head.

Explanation is made on a case to practically reproduce a record signal after adjusting the laser light intensity as described above. As was explained before, the laser light intensity is set to an intensity that the intensity itself cannot cause transfer of a magnetic domain from the recording layer to the reproducing layer 16. In this case, no magnetic domain to be reproduced is formed in the reproducing layer as shown in FIG. 15(A) only by illuminating laser light onto the magneto-optical recording medium, or disk 10. Thus no reproduced signal is outputted. If in the state the magnetic head drive circuit 52 is enabled by the microcomputer 50, i.e. by the control circuit 48, an alternating magnetic field Hex as shown in FIG. 16 is applied to the magneto-optical recording medium, or disk 10, through the magnetic head 36. Accordingly, when the alternating magnetic field Hex is in a particular polarity, a record magnetic domain recorded in the recording layer 14 is transferred with expansion into the reproducing layer 16 as shown in FIG. 15(B), thus forming an expanded transferred magnetic domain 26'.

Figure 4A:
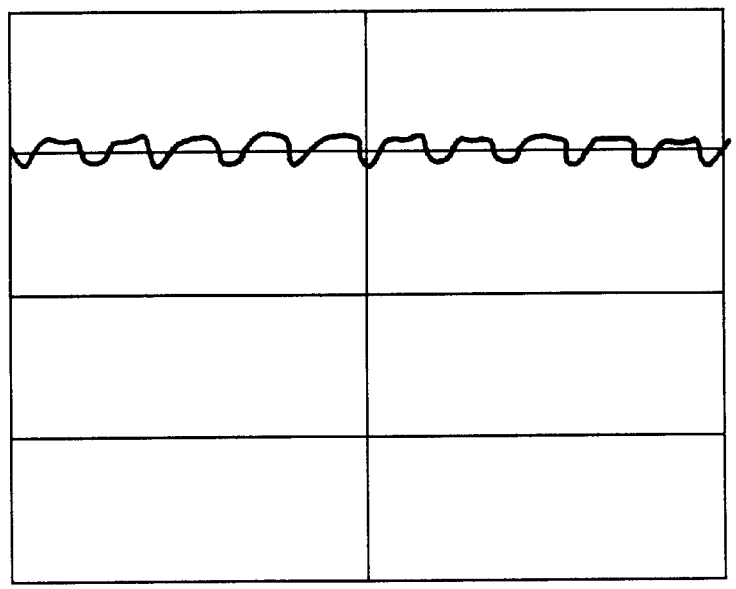
FIG. 4(A) shows one of during transfer and FIG. 4(B) is one of during expansion.
Figure 4B:
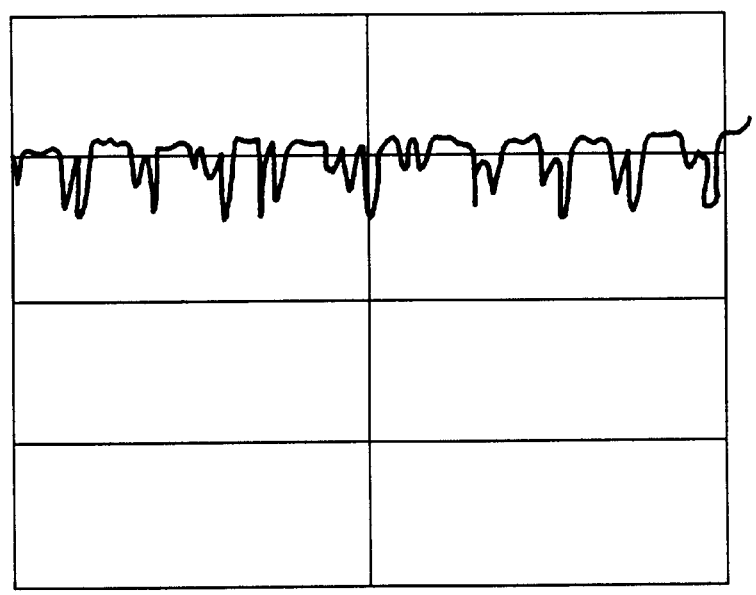
Figure 17:
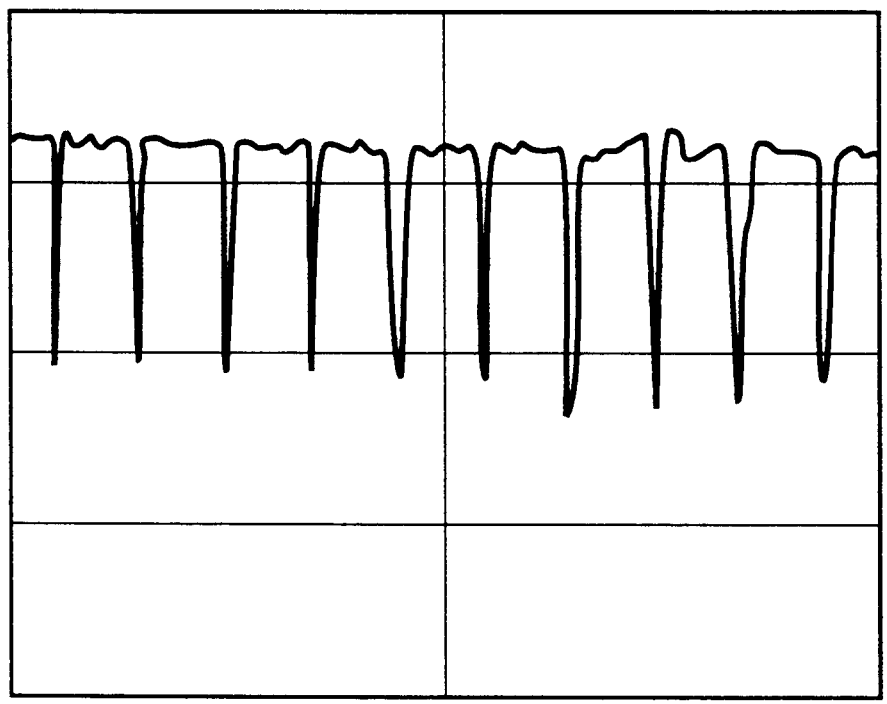
FIG. 17 is a waveform diagram showing a reproduced signal obtained in the FIG. 5 embodiment.

Consequently, a reproduced signal as shown in FIG. 17 is outputted from the reproduced signal amplifier circuit 40 of FIG. 5, i.e., from the low-pass filter 42. Referring to FIG. 17, it can be understood that the reproduced signal obtainable at this time is significantly increased in level as compared to the prior art reproduced signal as shown in FIG. 4(B).

If the alternating magnetic field changes to the other polarity as shown in FIG. 16, the magnetic domain having been transferred with expansion to the reproducing layer 16 is erased. Due to this, in FIG. 17 the reproduced signal becomes a pulse form. Incidentally, the respective times T1 and T2 of the alternating magnetic field polarities, shown in FIG. 16, may not necessarily be equal in ratio to each other. It is possible to set a duty ratio of optimal times T1 and T2 in accordance with the characteristics of the magneto-optical recording medium 10.

In this manner, in the present embodiment the intensity of laser light is set to an extent that no magnetic domain in the recording layer 14 is transferred into the reproducing layer 16. Due to this, if an alternating magnetic field Hex is applied, the record magnetic domain is expanded and transferred to the reproducing layer 16, thus providing a high level reproduced signal. As a result, the signal even if recorded in a small domain can be reproduced with a sufficiently high level, increasing record intensity as compared to the conventional.

Figure 18:
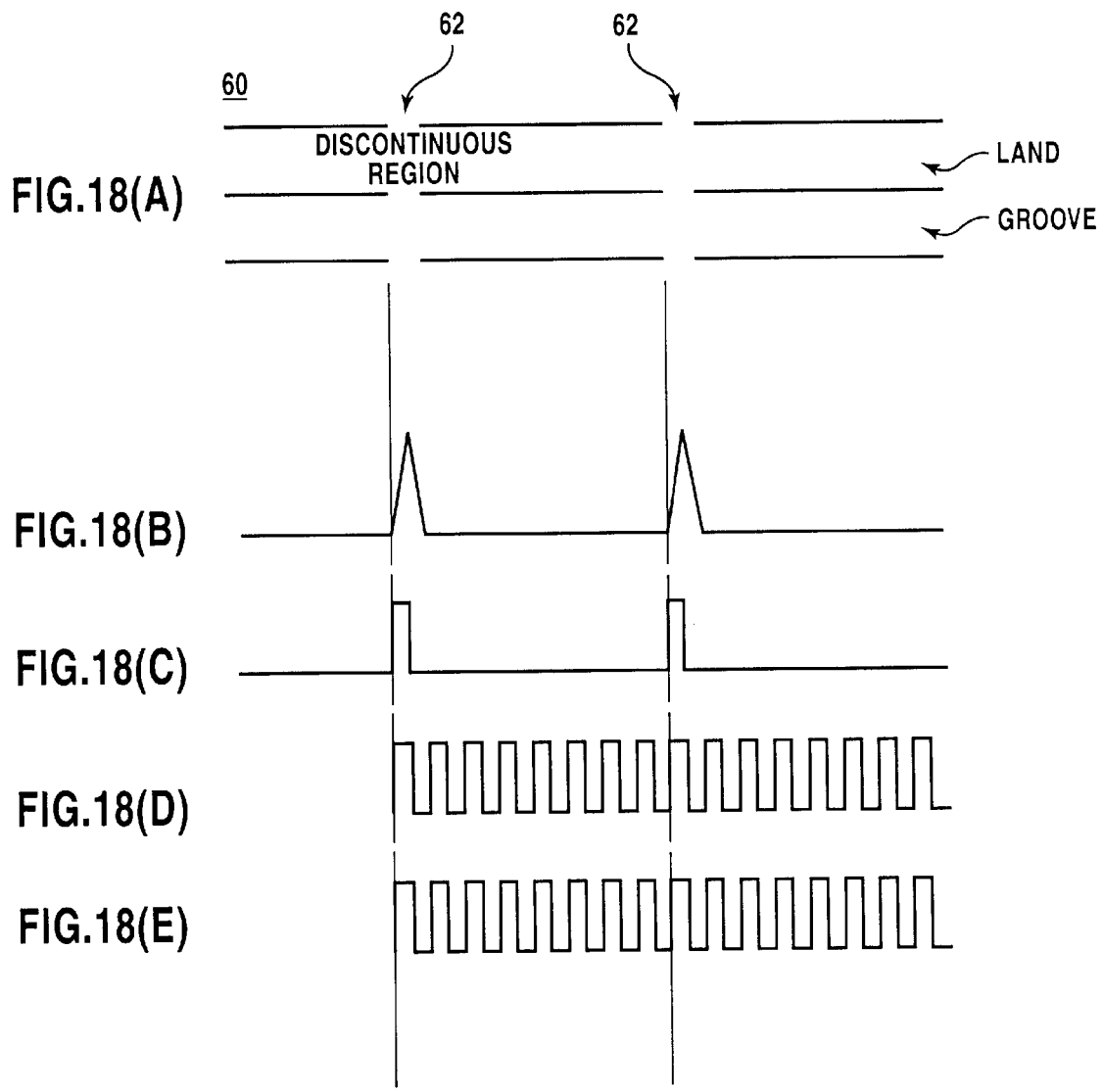
FIG. 18 is a timing chart showing operation of an external sync signal creating circuit in the FIG. 5 embodiment.

Now explanation is made on the timing of driving to the optical head 38 and the magnetic head 36. As shown in FIG. 18(A), the magneto-optical recording medium, or disk 10 is formed thereon with a land/groove schemed track 60. The track 60 has discontinuous regions 62 formed at a predetermined interval without having lands/grooves. For the discontinuous region 62, the optical head 38, i.e. the reproduced signal amplifier circuit 40, outputs a signal as shown in FIG. 18(B). This signal is delivered to the external synchronization signal creating circuit 58. The external sync signal creating circuit 58 compares, by a comparator (not shown), the reproduced signal with a reference voltage, thereby outputting a pulse signal as shown in FIG. 18(C). This pulse signal is supplied to the control circuit 48. The control circuit 48, in turn, supplies a pulse signal as shown in FIG. 18(E) to the laser drive circuit 54 and magnetic head drive circuit 52, in synchronism with the system clock given from the PLL 44 shown in FIG. 18(D) as well as the above-mentioned pulse signal. Laser may be by DC drive, or otherwise by pulse illumination wherein during a high level of the pulse signal the laser drive circuit 54 drives the laser device (not shown) of the optical head 36 that laser light controlled in output is intermittently illuminated through the optical head 38 onto the magneto-optical recording medium 10. However, no transfer of record magnetic domain occurs to the reproducing layer.

In response to the pulse signal of FIG. 18(E), the magnetic head drive circuit 52 drives magnetic head 36 to apply an alternating magnetic field as was shown in FIG. 16 onto the magneto-optical recording medium, or disk, 10. At this time, transfer with expansion of a record magnetic domain occurs to the reproducing layer, thus providing a reproduced signal.

Incidentally, in the embodiment the reproduced layer used a magnetic layer which assumes a perpendicular magnetic anisotropy film within a range of from room temperature to the reproducing temperature. However, the reproducing layer may be such a magnetic layer that assumes a plane magnetic anisotropy film at normal temperature and a perpendicular magnetic anisotropy film at elevated temperature. In this case, there may be a case that the application of an alternating external magnetic field be unnecessary for magnetic domain expansion.

Figure 19:
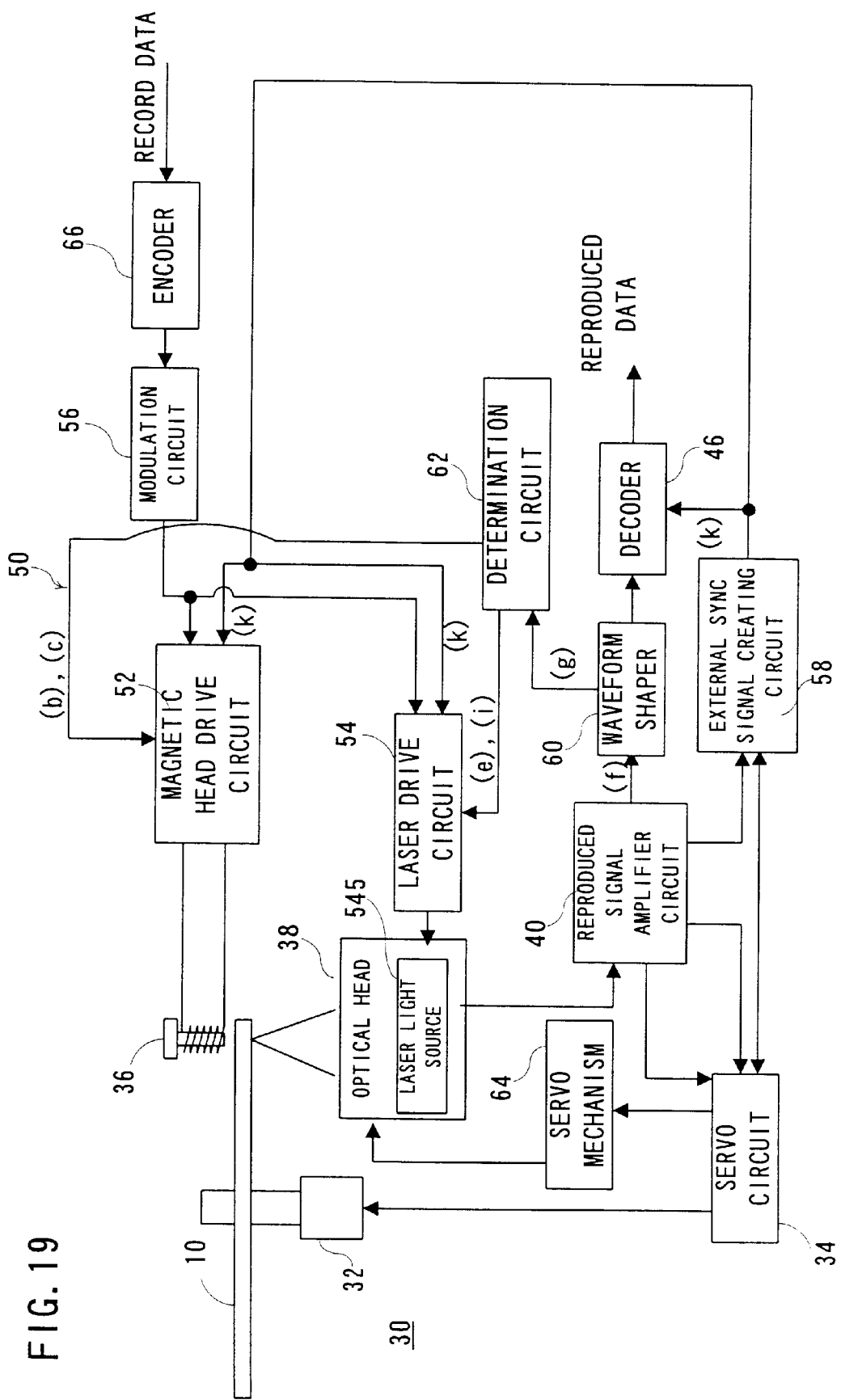
FIG. 19 is a block diagram showing a magneto-optical disk apparatus according to another embodiment of the invention.
Figure 21B:
FIG. 21 is an illustrative view showing a method to optimize laser light power.
Figure 21C:
Figure 21D:
Figure 21E:
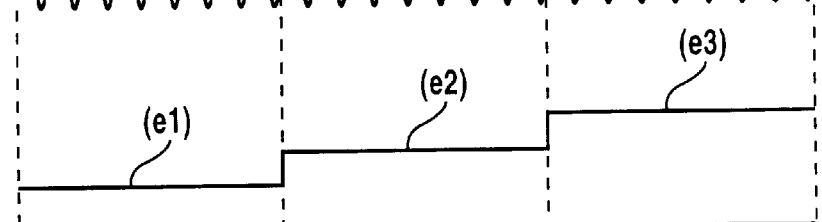
Figure 21F:
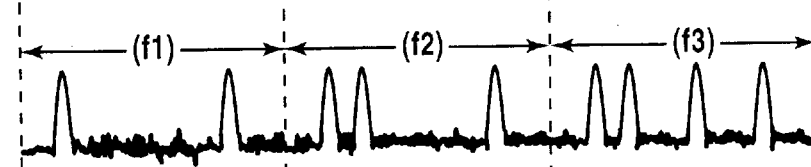
Figure 21G:
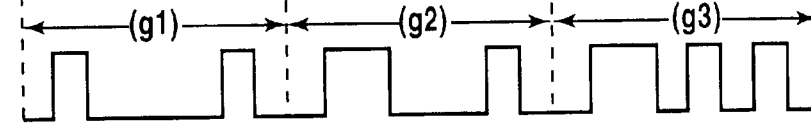
Figure 21I:
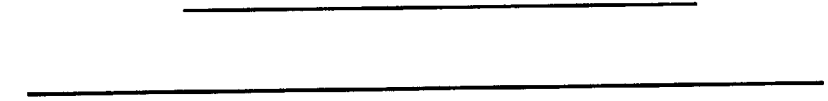

Referring to FIG. 19, a magneto-optical disk apparatus 30 according to another embodiment of the invention includes components similar to those of the FIG. 5 embodiment. Therefore, the components same as or similar to those of FIG. 5 are denoted by the same reference characters, omitting duplicated explanations hereinunder.

A magneto-optical disk apparatus 30 of FIG. 19 includes an optical head 38. This optical head 38 has a laser device 545 to illuminate a wave length of 635 (allowable error ±35, hereinafter the same) nm of laser light onto a magneto-optical recording medium 10 similarly to the FIG. 5 embodiment, and detects the reflection light therefrom.

A reproduced signal amplifier circuit 40 amplifies a focus error signal, tracking error signal, optical signal and magneto-optical signal detected by the optical head 38 to predetermined level, and then outputs the focus error and tracking error signals to a servo circuit 34, the optical signal to an external sync signal creating circuit 58 and magneto-optical signal to a waveform shaper 60. The waveform shaper 60 includes LPF 42 that is same as that of the FIG. 5 embodiment, and cuts the input magneto-optical signal of noise and converts an analog signal into a digital signal. The digital signal is outputted to decoder 46 and determination circuit 62.

The external sync signal creating circuit 58 creates an external sync signal according to a method hereinafter described based on the output optical signal, and outputs it to the servo circuit 34, the decoder 46, the laser drive circuit 54 and the magnetic head drive circuit 52.

The servo circuit 34 controls a servo mechanism 64 based on the input focus error and tracking error signals and causes a spindle motor 32 to rotate at a predetermined rotational speed in synchronism with the inputted external sync signal. This servo mechanism 64 performs tracking servo and focus servo for an objective lens (not shown) included in the optical head 38, based on the focus error and tracking error signals.

Incidentally, an encoder 66 encodes record data and outputs it to a modulation circuit 56. The modulation circuit 56 modulates the record signal to a predetermined scheme. Where signal record is made by a magnetic field modulation scheme, the modulation circuit 56 outputs a modulated record signal to the magnetic head drive circuit 52. Where recording is by an optical modulation scheme, the modulation circuit outputs the modulated record signal to the laser drive circuit 54.

The determination circuit 62 inputs a digitized magneto-optical signal from the waveform shaper 60 and determines by a method hereinafter described whether the digitized magneto-optical signal substantially agrees with the record signal or not, thereby determining laser light power suited for magnetic domain reproduction with expansion. Incidentally, although the determination circuit 62 may be structured as a discrete component, preferably it is formed as a part of the microcomputer 50 function of FIG. 5 embodiment.

Although the principle of magnetic domain expansion and reproduction were explained before with reference to FIG. 2, it is again explained with reference to FIG. 20. A magneto-optical recording medium 10 includes a recording layer 14, an intermediate or non-magnetic layer 18 and a reproducing layer 16. In the case of effecting magnetic domain expansion and reproduction, the reproducing layer 16 is initially magnetized in one given direction (see FIG. 20(A)).

When performing magnetic domain expansion and reproduction, the magneto-optical recording medium 10 is illuminated by laser light 24 from a side of the reproducing layer 16 and applied by an alternating magnetic field Hex from a side of the recording layer 14 (see FIG. 20(B)).

Thereupon, the recording layer 14 at a region of a magnetic domain 22 is heated to a predetermined temperature or higher by the laser light 24. The magnetic domain 22 is transferred with expansion into the reproducing layer 16 through the intermediate or non-magnetic layer 18 by static magnetic coupling in timing that a same direction of a magnetic field as that of magnetization of the magnetic domain 22 is applied due to the alternating magnetic field Hex. Thus, an expanded magnetic domain 23 magnetized in the same direction as that of the magnetic domain 22 comes into existence in the reproducing layer 16 (see FIG. 20(C)). The laser light 24 illuminated on the reproducing layer 16 is rotated in its polarizing plane and reflected thereon due to the magnetization of the magnetic domain 23. The detection of the reflection light enables reproduction of a signal having been recorded as the magnetic domain 22.

After ending the detection of the magnetic domain 23 due to the laser light 24, a magnetic field is applied in a opposite direction to the magnetization of the magnetic domain 23 whereby the magneto-optical recording medium 10 returns to the initial state (FIG. 20(A)) to reproduce a next magnetic domain in the similar manner.

In the magnetic domain expansion and reproduction as explained with reference to FIG. 20, the power of laser light is extremely important that is to be illuminated to a magneto-optical recording medium 10. From this point of view, in the embodiment as was explained with reference to FIG. 5, magnetic domain expansion and reproduction were made by illuminating to the magneto-optical recording medium 10 the laser light having such an intensity that cannot cause transfer of a magnetic domain from the recording layer into the reproducing layer only by the laser light illumination.

However, it has been revealed from a continuous study conducted by the present inventors that, even where illuminating laser light having power of within the above-mentioned range, there is a case that a magnetic domain in the recording layer 14 be not accurately transferred with expansion to the reproducing layer 16 as the power may be.

FIG. 19 shows an embodiment for providing a method that determines laser light power to cause accurate transfer with expansion of a magnetic domain of the recording layer 14 to the reproducing layer 16 and reproducing the magnetic domain of recording layer 14 based on the determined laser light power by magnetic domain expansion, and a magneto-optical disk apparatus using that method.

Referring to FIGS. 19 and 21, a magneto-optical recording medium 10 is loaded on the magneto-optical disk apparatus 30. If established is a state that signal recording onto the magneto-optical recording medium 10 is possible by a usual method, the determination circuit 62 outputs to the magnetic head drive circuit 52 a drive signal (B) (also referred to as "first drive signal") made by binalizing a predetermined record signal (A) (see FIG. 21). The magnetic head drive circuit 52 drives the magnetic head 36 based on the drive signal (B) inputted in synchronism with an external sync signal (k) given from the external sync signal creating circuit 58. A magnetic field is applied to the magneto-optical recording medium 10, based on the drive signal (B) give from the magnetic head 36 whereby the predetermined record signal (A) is decoded on the magneto-optical recording medium 10. In this case, the laser drive circuit 54 drives the laser light source 54S to thereby illuminate a predetermined intensity of laser light to the magneto-optical recording medium 10 through the optical head 38.

After ending to record the predetermined record signal (A), the power of laser light is changed to reproduce the predetermined recorded signal (A). In this case, the determination circuit outputs a drive signal (c) to the magnetic head drive circuit 52 and a drive signal (e) (also referred to as "second drive signal") to the laser drive circuit 54. The drive signal (c) is to create an alternating magnetic field, while the drive signal (e) is to change the power of laser light to be irradiated through the optical head 38. The magnetic head drive circuit 52 drives the magnetic head based on the drive signal (c) to apply an alternating magnetic field (d) to the magneto-optical recording medium 10 through the magnetic head 36. On the other hand, the laser drive circuit 54 drives the laser light source 54S based on the drive signal (e) whereby 3 kinds of laser light different in power level are illuminated for a given duration to the magneto-optical recording medium 10 through the optical head 38.

In the case where the laser light source 54S is driven based on signal (e1) of the drive signal (e) to illuminate laser light onto the magneto-optical recording medium 10 through the optical head 38, a magneto-optical signal (f1) is detected. Also, where the laser light source 54S is driven based on a signal (e2) to illuminate laser light to the magneto-optical recording medium 10 through the optical head 38, a magneto-optical signal (f2) is detected. Further, where the laser light source 54S is driven based on a signal (e3) to illuminate laser light to the magneto-optical recording medium 10 through the optical head 38, a magneto-optical signal (f3) is detected. The laser light due to drive based on the signal (e1) has a power of 1.9 mW. The laser light due to drive based on the signal (e2) has a power of 2.0 mW. The laser light due to drive based on the signal (e3) has a power of 2.1 mW. These power levels are those in emission through the optical head 38. Also, the alternating magnetic field (d) for application has a peak intensity of ±300 Oe.

The conversion of the magneto-optical signals (f1), (f2) and (f3) detected for respective ones of laser light power provides signals (g1), (g2) and (g3). The signal (g1) means "01000010", the signal (g2) "01100010", and the signal (g3) "01101010". The signals "01000010" and "01101010" are different from the predetermined record signal (A) but the signal "01100010" agrees with the predetermined record signal (A). That is, when the laser light has a power level of 1.9 mW, a signal "01000010" is detected wherein for the predetermined record signal "01100010" the third-positioned "1" is erroneously detected as "0". Also, when the laser light has a power level of 2.1 mW, a signal "01101010" is detected wherein for the predetermined record signal "01100010" the fifth-positioned "0" is erroneously detected as "1". Furthermore, when the laser light has a power level of 2.0 mW, a signal "01100010" is detected which agrees with the predetermined record signal "01100010". Consequently, when the laser light is too weak in power level, the signal to be detected "1" is erroneously detected as "0". When the laser light is too intense in power level, the signal to be detected "0" is erroneously detected as "1".

In this embodiment, the laser light is varied in power level to perform magnetic domain expansion and reproduction so that a laser light power at which a detected magneto-optical, or reproduced signal agrees with a record signal is determined as a laser light power level suited for magnetic domain expansion and reproduction. In the above example, where magnetic domain expansion and reproduction are performed by setting the laser light power level at 2.0 mW, the reproduced signal coincides with the predetermined record signal (A). Therefore, the laser light power is determined 2.0 mW as a level suited for magnetic domain expansion and reproduction.

Referring again to FIG. 19, the magneto-optical signals (f1), (f2) and (f3) detected due to magnetic domain expansion and reproduction by varying the laser light power level are inputted to the waveform shaper 60 through the reproduced signal amplifier circuit 40. The waveform shaper 60 converts the signals (f1), (f2) and (f3) into digital signals (g1), (g2) and (g3) to be outputted to the determination circuit 62.

The determination circuit 62 determines whether or not each of the input signals (g1), (g2) and (g3) coincides with a signal (B) as a digital signal of the predetermined record signal (A), thereby detecting a reproduced signal (g2) that agrees with the signal (B). If a reproduced signal (g2) coincident with the signal (B) is detected, the determination circuit 62 outputs a signal (i) to the laser drive circuit 54 such that the power of laser light to be emitted through the optical head 38 is set to a laser light power level at which the reproduced signal has been detected. The laser drive circuit 54 drives the laser optical source 545 based on the signal (i) so that laser light having a power level suited for magnetic domain expansion and reproduction is illuminated through the optical head 38 onto the magneto-optical recording medium 10. Due to this magnetic domain expansion and reproduction are effected with accuracy.

Figure 22:
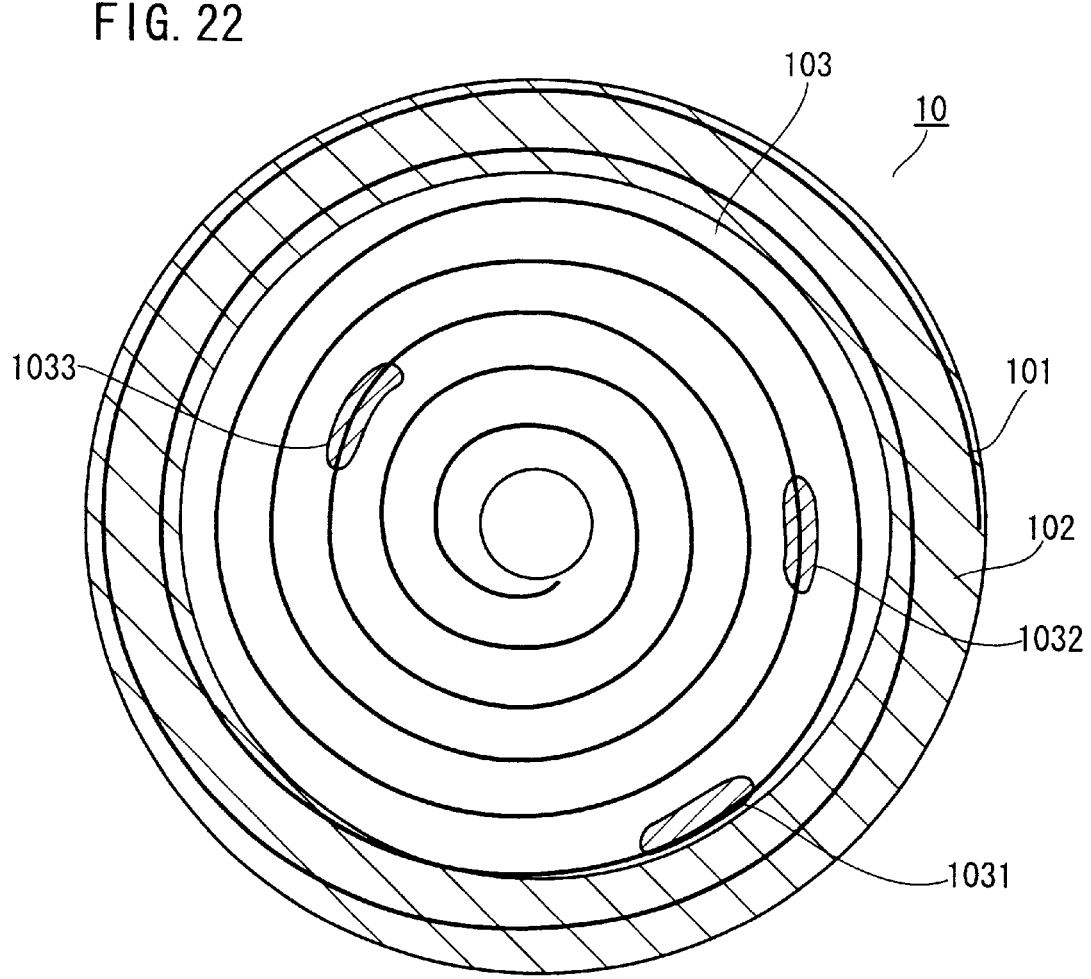
FIG. 22 is an illustrative view showing in plan a magneto-optical recording medium.

FIG. 22 illustrates a plan view of the magneto-optical recording medium 10. The magneto-optical recording medium 10 has a spirally-formed track 101 having a TOC region 102 provided at an outer periphery and a data region 103 placed following the TOC region 102. The optimization for laser light power may be made by a calibration region 1031 (corresponding to the region 11 in FIGS. 7 to 11) provided at the beginning of the data region 103. Also, a plurality of calibrations 1031, 1032 and 1033 may be formed in the data region 103 in order to implement laser light power optimization by each of the calibrations 1031, 1032 and 1033.

Figure 23:
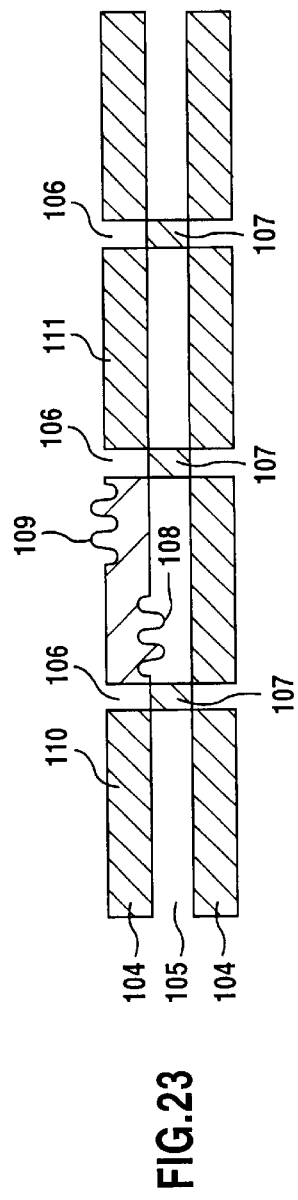
FIG. 23 is an illustrative view showing in plan tracks formed on the magneto-optical recording medium.

In the case of an ASMO, as shown in FIG. 23 a track is structured by grooves 104 and lands 105. The grooves 104 and lands 105 are respectively formed with discontinuous regions 106, 106, . . . , and 107, 107, . . . with a constant period. One continuity of grooves at opposite walls is recorded, as wobbles 108 and 109, with address information about the groove and the land adjacent the groove. Accordingly, laser light power optimization may be made in any of the preceding region 110 and succeeding region 111 to the region formed with the wobbles 108 and 109.

Figure 24:
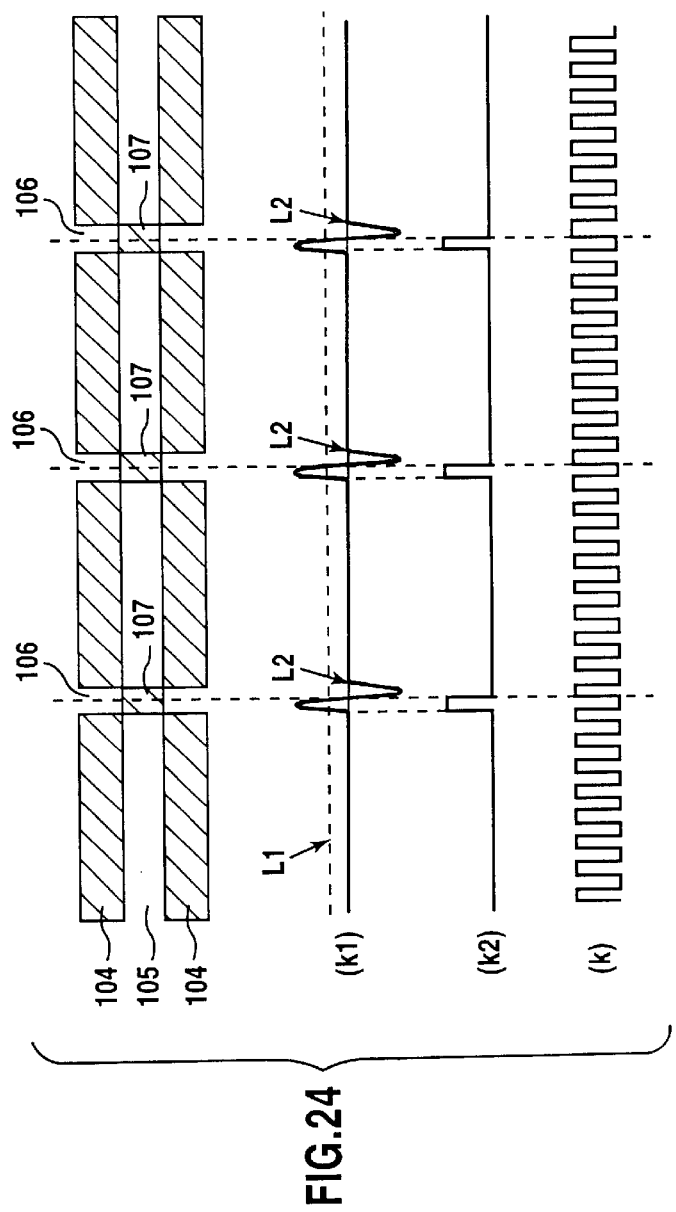
FIG. 24 is an illustrative view showing to create an external sync signal.

Referring to FIG. 24, explanation is made on creation of an external synchronization signal (k). The magneto-optical recording medium 10 has, as explained above, a track structure having grooves 104 and lands 105 formed in an alternate fashion. The grooves 104 and the lands 105 is formed respectively with discontinuous regions 106, 106, . . . , and 107, 107, . . . with a constant period. If laser light is illuminated onto the track structure constructed as above, a signal (k1) is detected by detecting an intensity of reflection light. By discriminating the signal (k1) between a first level L1 and a second level L2, a pulse signal (k2) is created. Further, an external sync signal (k) is created in a form that a predetermined number of periodic signals exist between pulses of the pulse signal (k2).

The external sync signal (k) is created due to discontinuous regions 106, 106, . . . and 107, 107, . . . on the magneto-optical recording medium 10. Consequently, even if a reproduced signal is missing over 1 track or more, it is possible to create a sync signal in a stable fashion.

Figure 25:
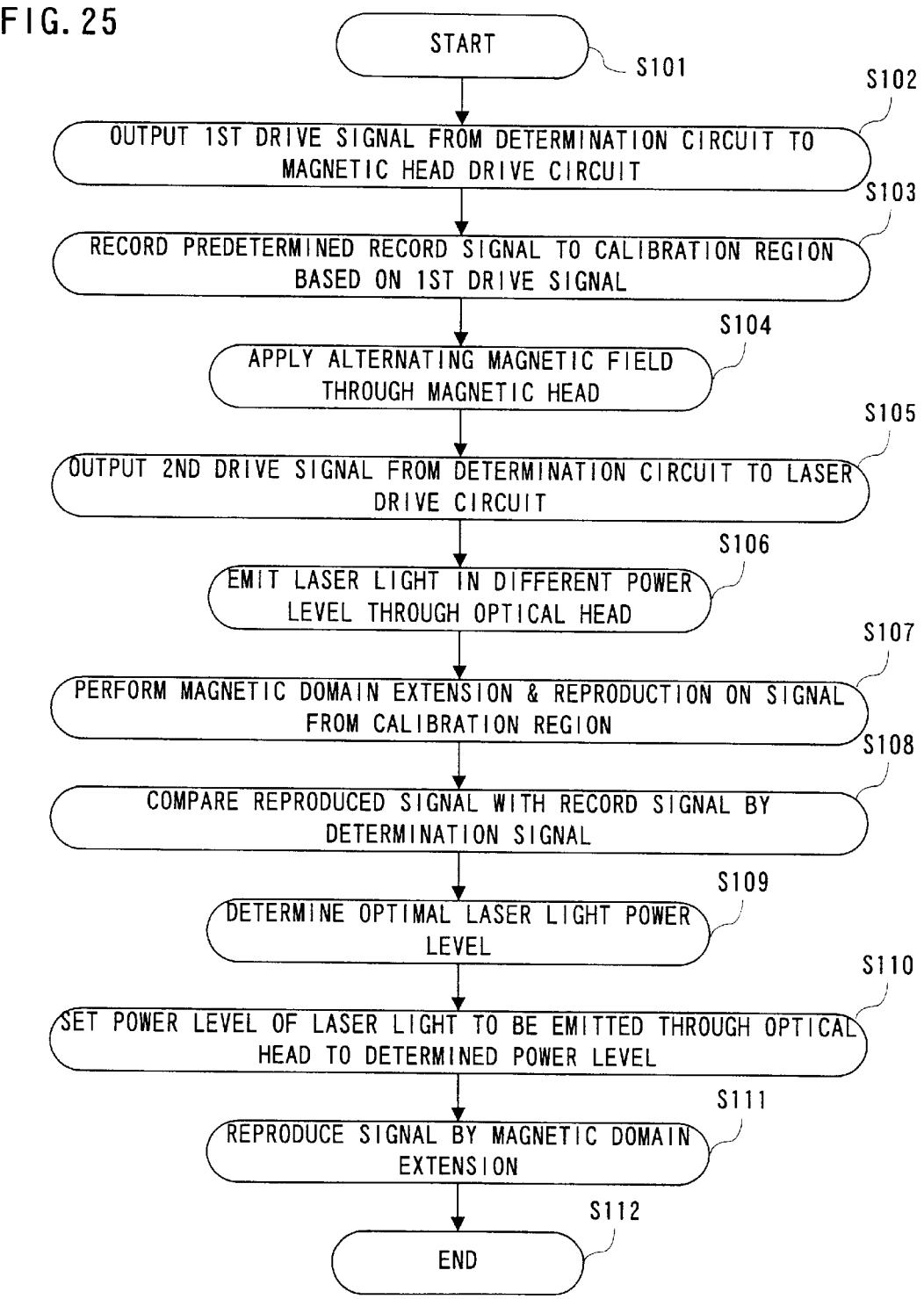
FIG. 25 is a flowchart showing a reproducing method using magnetic domain expansion in the FIG. 19 embodiment.

Referring to FIG. 25, explanation will be made on a flowchart on a method for magnetic domain expansion and reproduction according to the invention. If started in step S101, then in step S102 a first drive signal is outputted from the determination circuit 62 to the magnetic head drive circuit 52. The first drive signal is to record a predetermined record signal (A) of FIG. 21. In step S103 a predetermined record signal (A) is recorded on a calibration region based on the first drive signal. After recording the predetermined record signal (A), in step S104 an alternating magnetic field (d) is applied through the magnetic head 36 onto the magneto-optical recording medium 10. In step S105 a second drive signal is outputted from the determination circuit 62 to the laser drive circuit 54. The second drive signal is a signal (e) to emit different power levels of laser light through the optical head 38. In step S106 the laser drive circuit drives the laser light source 545 based on the second drive signal to illuminate different power levels of laser light through the optical head 38 to the magneto-optical recording medium 10. In step S107 the predetermined record signal (A) is detected as magneto-optical signals (f1), (f2) and (f3) from the calibration region by the respective power levels of laser light. The detected magneto-optical signals (f1), (f2) and (f3) are converted into digital signals (g1), (g2) and (g3) and then inputted in step S108 to the determination circuit 62. Determination circuit 62 compares the input digital signals (g1), (g2) and (g3) with a digital signal (B) of the predetermined record signal (A), thereby detecting the digital signal (g2) coincident with the digital signal (B). In step S109 the laser light power level with which the digital signal (g2) was detected is determined as an optimal power level for magnetic domain expansion and reproduction.

If an optimal laser light power level has been determined, then in step S110 setting is made, to the determined power level, the power level of the light to be emitted through the optical head 38 to the determined power level. In step S111 magnetic domain expansion and reproduction are carried out. In step S112 the operation of signal reproduction is ended.

The flowchart of FIG. 25 shows the operation that the loaded magneto-optical recording medium is not previously recorded with a predetermined record signal (A). However, in the case that the magneto-optical recording medium is previously recorded with a predetermined record signal (A), signal reproduction is made due to magnetic field expansion based on a flowchart shown in FIG. 26.

Figure 26:
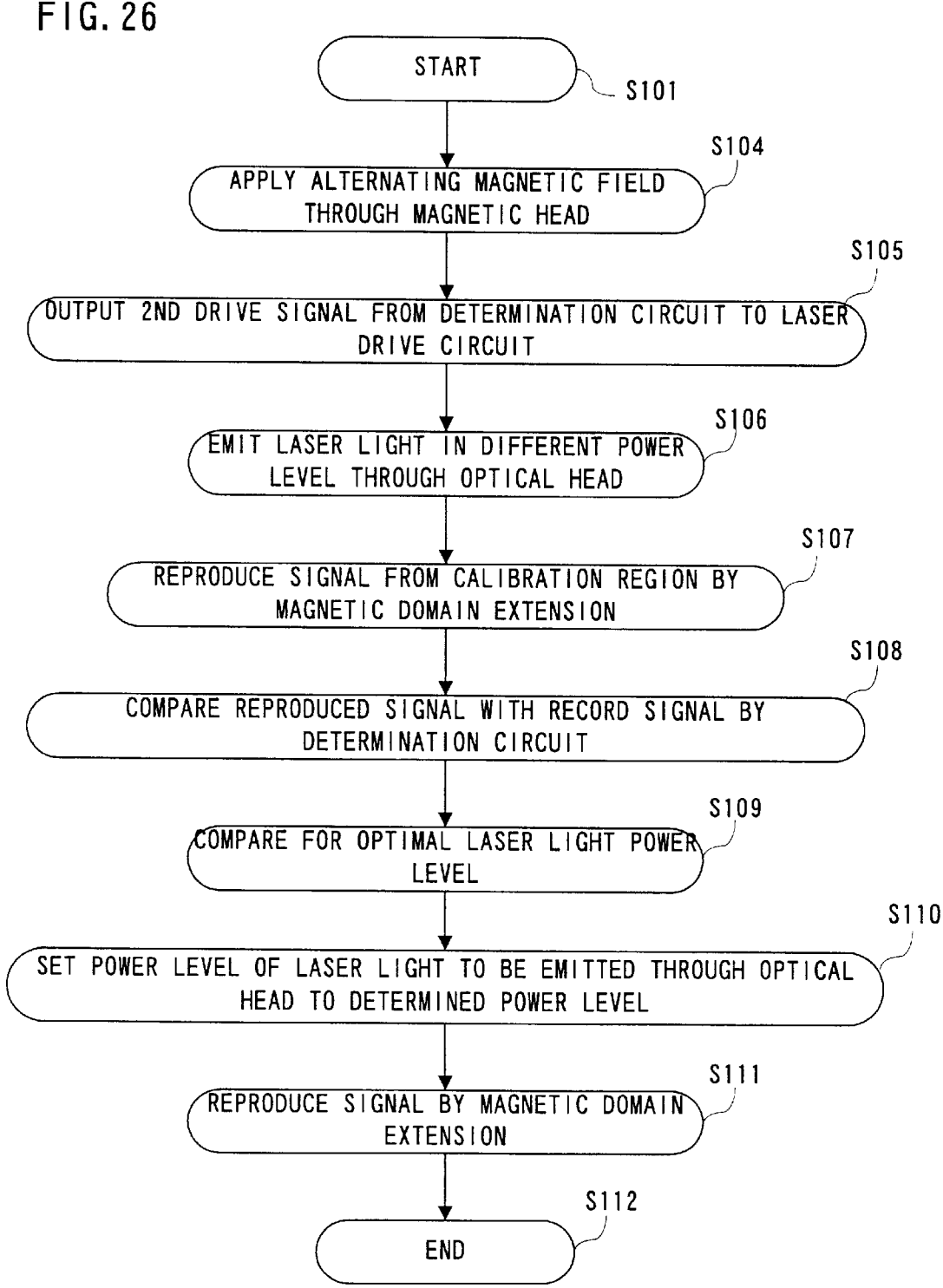
FIG. 26 is a flowchart showing another reproducing method using magnetic domain expansion in the FIG. 19 embodiment.

The flowchart shown in FIG. 26 is a flowchart which omits the steps S102 and S103 from the flowchart of FIG. 25. Other steps are the same as those of the flowchart of FIG. 25, omitting the explanations.

Figure 27:
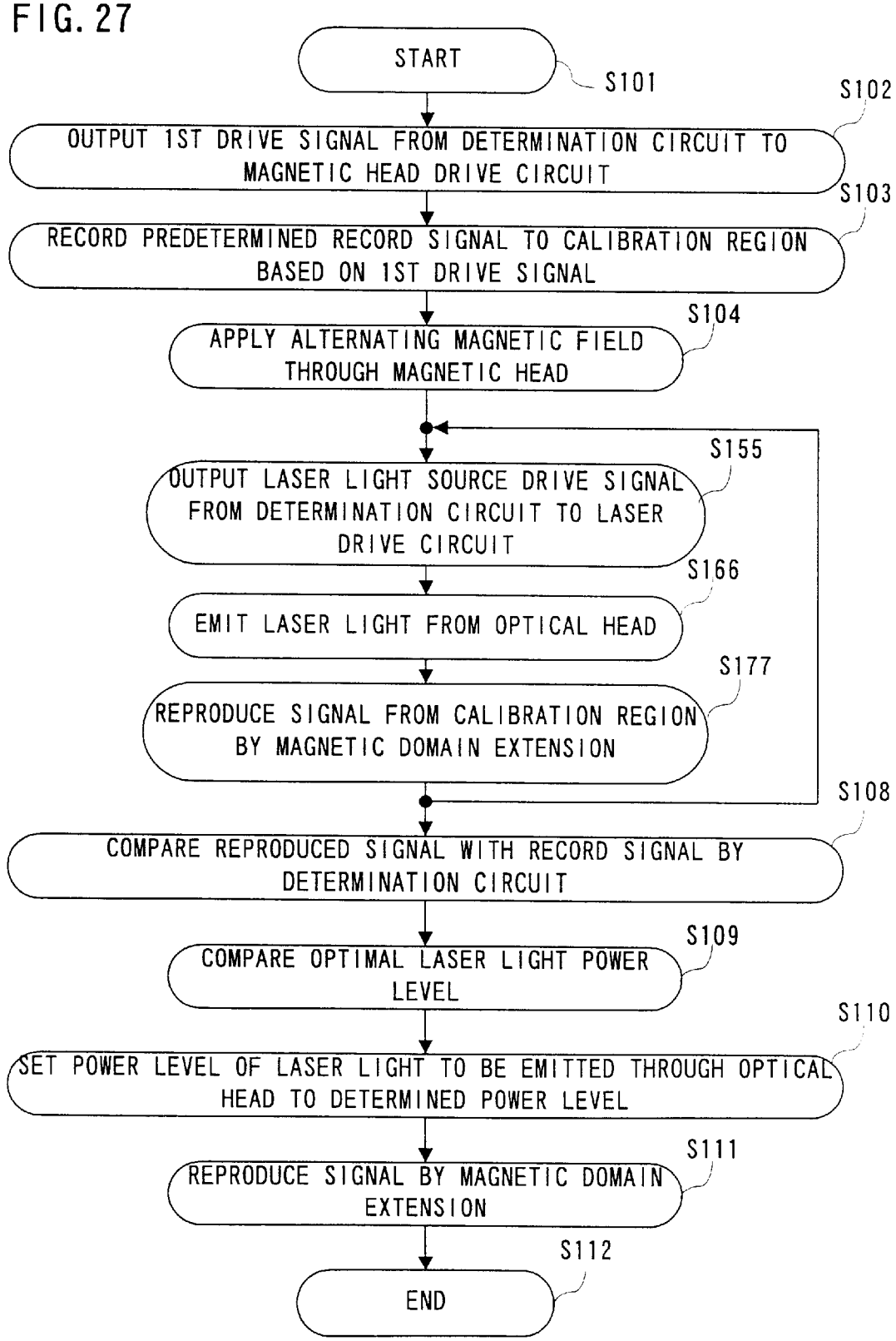
FIG. 27 is a flowchart showing still another reproducing method using magnetic domain expansion in the FIG. 19 embodiment.

Meanwhile, in the flowchart of FIG. 25, the determination circuit 62 when changing in 3 stages the laser light power level outputs once a drive signal to the laser drive circuit 54. However, the invention is not limited to this manner. That is, as shown in FIG. 27, magnetic domain expansion and reproduction may be made and then the laser light source 545 be driven by a second level of power to effect magnetic domain expansion and reproduction by applying that power level. That is, the steps S101 to S104 are the same as those of FIG. 25. In step S155 the determination circuit 62 outputs a drive signal to the laser drive circuit 54 such that a first power level of laser light is emitted through the optical head 38. In step S166 the optical head 38 illuminates a first power level of laser light onto the magneto-optical recording medium 10, and in step S177 magnetic domain expansion and reproduction are carried out on the calibration region with the first power level of laser light. Thereafter, the process returns to the step S155 where the discrimination circuit 62 outputs drive signal to the laser drive circuit 54 such that a second power level of laser light is emitted through the optical head 38. Thereafter, the steps S166 and S177 are executed similarly to the above, and the process returns to the step S155. Then the power of laser light is set to a third power level to effect magnetic domain expansion and reproduction.

After ending the magnetic domain expansion and reproduction with change of laser light power, the process moves to a step S108 to effect magnetic domain expansion and reproduction in the same manner as that of FIG. 25.

Figure 28:
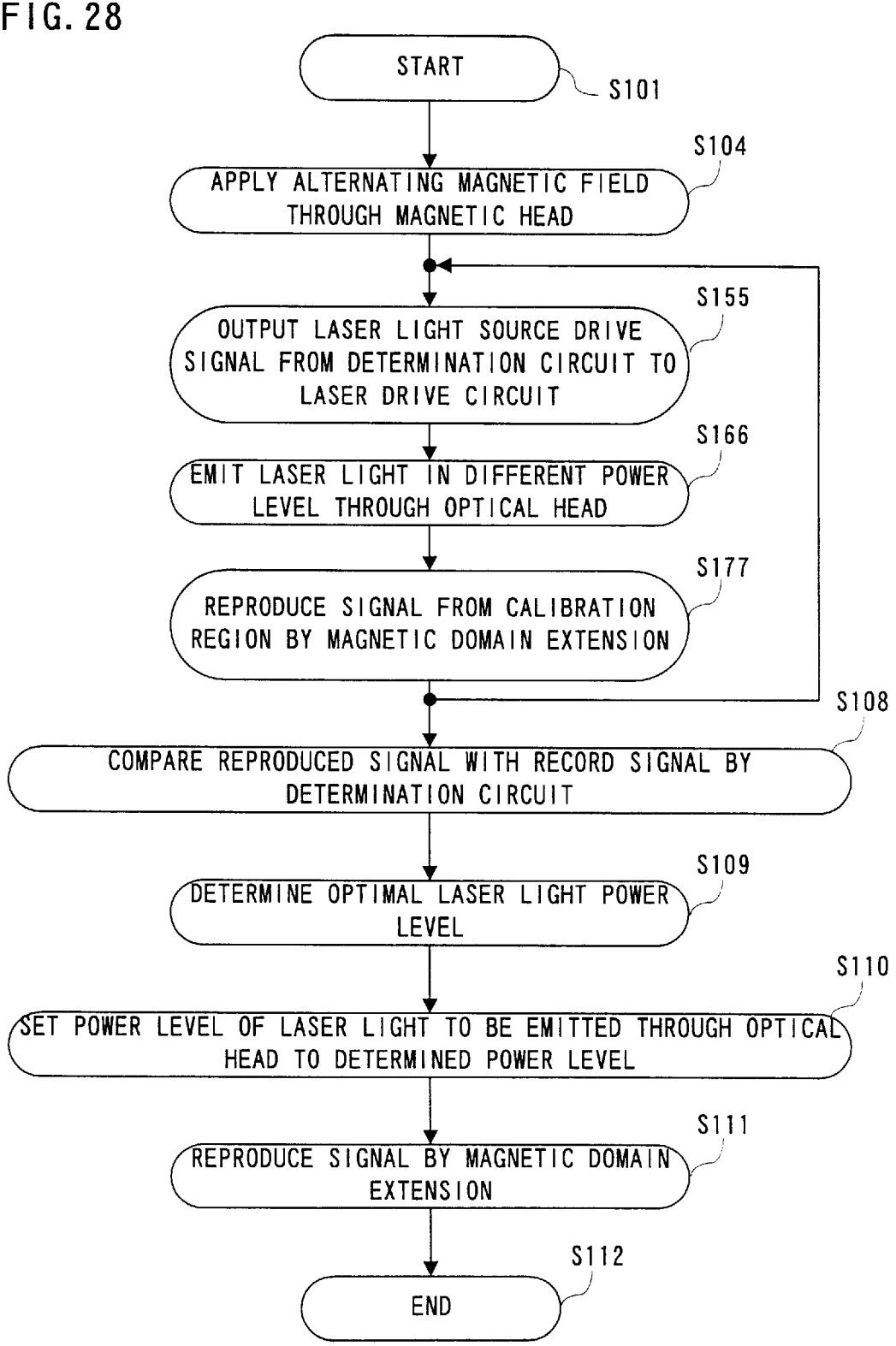
FIG. 28 is a flowchart showing another reproducing method using magnetic domain expansion in the FIG. 19 embodiment.

FIG. 27 is on the case that the magneto-optical recording medium is not previously recorded with a predetermined record signal to optimize the laser light power level. Meanwhile, for a case that the magneto-optical recording medium is previously recorded with predetermined record signal, magnetic domain expansion and reproduction are made by certain power level of laser light and then the power level is changed for reproduction, as shown by a flowchart of FIG. 28.

This embodiment is characterized by determining an optimal power level of laser light for magnetic domain expansion and reproduction and then performing a reproducing operation due to magnetic domain expansion. Accordingly, the present embodiment is applicable to an arbitrary magneto-optical disk apparatus which performs magnetic domain expansion and reproduction by changing the power level of laser light and determining as an optimal power level for magnetic domain expansion a power level of laser light that a reproduced signal coincides with a predetermined record signal.

Also, this embodiment is applicable to an arbitrary magneto-optical disk apparatus which performs magnetic domain expansion and reproduction on a predetermined record signal having been recorded on magneto-optical recording medium by changing the power level of laser light and determines as an optimal power level for magnetic domain expansion a power level of laser light that a reproduced signal coincides with the predetermined record signal.

Accordingly, the block diagram for the magneto-optical disk apparatus is not limited to those shown in FIG. 5 or FIG. 19. An apparatus may be usable which comprising a block diagram that can realize the above explained function.

Also, the reproducing method may be a producing method that determines an optimal power level of laser light for magnetic domain expansion and then effecting magnetic domain expansion and reproduction using the determined power level of laser light.

Figure 2A:
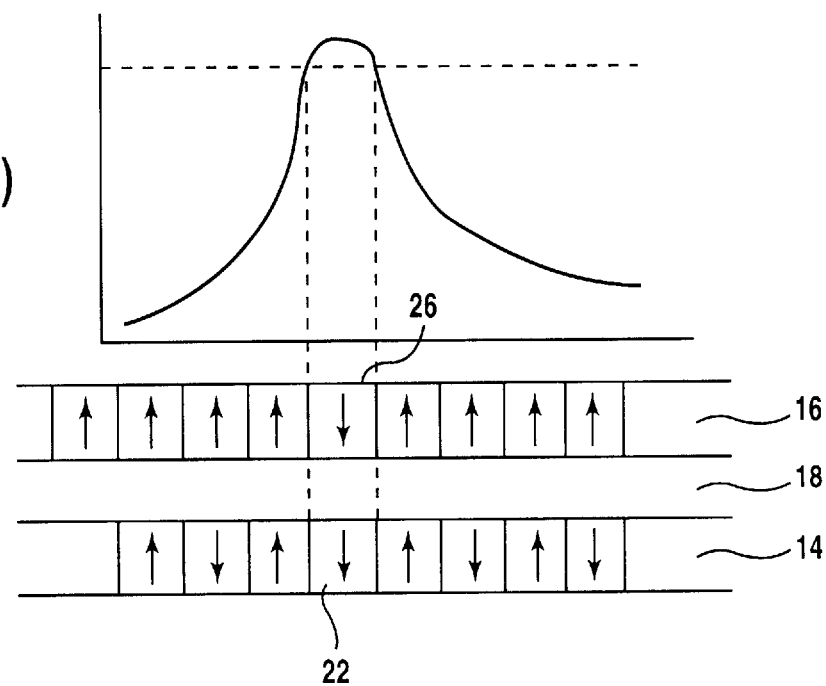
Figure 2B:
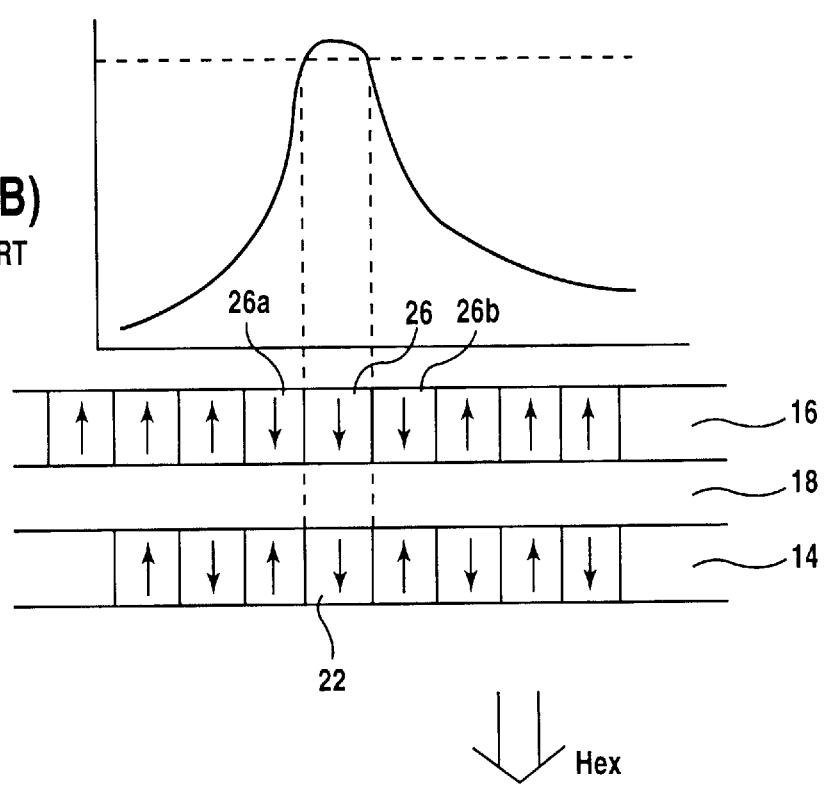
FIG. 2(B) is after expansion.

Furthermore, the magnetic material structure for the magneto-optical recording medium 10 of this invention is not limited to that shown in FIG. 2, but may be one that can transfer with expanding a magnetic domain in the recording layer into the reproducing layer.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A reproducing apparatus for a magneto-optical recording medium to transfer, during reproduction, a magnetic domain recorded within a recording layer into a reproducing layer, comprising:
    an optical means for illuminating laser light with a predetermined intensity not to cause transfer of said magnetic domain from said recording layer to said reproducing layer; and
    a magnetic field applying means for applying alternating magnetic field to said magneto-optical recording medium;
        wherein said magnetic domain is transferred with expansion from said recording layer to said reproducing layer by applying alternating magnetic field to said magneto-optical recording medium in a state that said predetermined intensity of laser light is illuminated to said magneto-optical recording medium.

2. A reproducing apparatus according to claim 1, wherein said magnetic field applying means applies alternating magnetic field in response to a timing signal.

3. A reproducing apparatus according to claim 2, further comprising a timing signal generating means for generating said timing signal in synchronism with an external sync signal to be obtained based on a physical structure of said magneto-optical recording medium.

4. A reproducing apparatus according to claim 3, wherein said timing signal generating means includes an external sync signal creating circuit to create said external sync signal based on said physical structure.

5. A reproducing apparatus according to claim 4, wherein said magneto-optical recording medium has a track of a land/groove scheme and includes a discontinuous region formed with said groove at predetermined interval, said external sync signal creating circuit creating said external sync signal responsive to said discontinuous region.

6. A reproducing apparatus according to any of claims 1 to 5, wherein said optical means includes an intensity adjusting means to adjust an intensity of laser light.

7. A reproducing apparatus according to claim 6, wherein said magneto-optical recording medium includes a particular region previously recorded with a signal to adjust an intensity of said laser light by said intensity adjusting means.

8. A recording apparatus according to claim 7, wherein said particular region is formed for each sector.

9. A reproducing apparatus according to claim 7, wherein said particular region is formed for each zone.

10. A method of reproducing with a magneto-optical recording medium to transfer, during reproduction, a magnetic domain recorded within a recording layer into a reproducing layer, comprising:
    (a) illuminating laser light with a predetermined intensity not to cause transfer of said magnetic domain from said recording layer to said reproducing layer; and thereafter
    (b) applying alternating magnetic field to said magneto-optical recording medium, whereby
        said magnetic domain is transferred with expansion from said recording layer to said roducing layer.

* * * * *